United States Patent
Shimizu et al.

(10) Patent No.: US 12,322,978 B2
(45) Date of Patent: Jun. 3, 2025

(54) MOBILE PRINTER

(71) Applicant: SEIKO EPSON CORPORATION, Tokyo (JP)

(72) Inventors: Michihiro Shimizu, Nagano (JP); Kazuyuki Morimoto, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 18/058,365

(22) Filed: Nov. 23, 2022

(65) Prior Publication Data

US 2023/0170735 A1 Jun. 1, 2023

(30) Foreign Application Priority Data

Nov. 26, 2021 (JP) ................................. 2021-191946

(51) Int. Cl.
*B41J 29/02* (2006.01)
*H02J 50/10* (2016.01)
*B41J 3/36* (2006.01)
*B41J 11/70* (2006.01)

(52) U.S. Cl.
CPC ................ *H02J 50/10* (2016.02); *B41J 3/36* (2013.01); *B41J 11/70* (2013.01)

(58) Field of Classification Search
CPC ..................................... B41J 11/70; B41J 3/36
See application file for complete search history.

(56) References Cited

U.S. PATENT DOCUMENTS

| | | | |
|---|---|---|---|
| 2002/0020273 A1* | 2/2002 | Nomura | B26D 5/08 83/623 |
| 2009/0096413 A1* | 4/2009 | Partovi | H02J 7/0013 320/108 |
| 2012/0120461 A1* | 5/2012 | Oshima | H04N 1/00551 358/474 |
| 2017/0057263 A1* | 3/2017 | Vo | H02J 7/0048 |
| 2017/0207660 A1 | 7/2017 | Kato | |
| 2019/0148984 A1* | 5/2019 | Bevelacqua | H04B 5/24 307/104 |

FOREIGN PATENT DOCUMENTS

JP 2014-195885 A 10/2014
JP 2017-131003 A 7/2017

* cited by examiner

*Primary Examiner* — Jared Fureman
*Assistant Examiner* — Esayas G Yeshaw
(74) *Attorney, Agent, or Firm* — Global IP Counselors, LLP

(57) ABSTRACT

A mobile printer includes: a roll body accommodating portion accommodating a roll body on which recording paper is wound; a print head performing printing on the recording paper; a transport unit pulling out the recording paper from the roll body and transporting the recording paper to the print head; a cutting unit cutting the recording paper; a power supply unit supplying a drive voltage signal to the print head, the transport unit, and the cutting unit; and a housing covering the roll body accommodating portion, the print head, the transport unit, the cutting unit, and the power supply unit, in which the power supply unit has a power receiving module receiving a signal based on a power supply voltage signal from an outside by a non-contact power supply, and the power receiving module is fixed to a power supply surface of the housing by an adhesive member.

11 Claims, 9 Drawing Sheets

MOBILE PRINTER

The present application is based on, and claims priority from JP Application Serial Number 2021-191946, filed Nov. 26, 2021, the disclosure of which is hereby incorporated by reference herein in its entirety.

BACKGROUND

1. Technical Field

The present disclosure relates to a mobile printer.

2. Related Art

A mobile printer having a small size and a light weight and capable of performing a printing process for forming an image on a medium has been proposed in the related art. For example, JP-A-2017-131003 discloses a portable thermal printer (mobile printer) including a wireless power supply unit.

However, there is still room for improvement in the mobile printer disclosed in JP-A-2017-131003 from a viewpoint of supplying power to the mobile printer by using wireless supply of the power.

SUMMARY

One aspect of a mobile printer according to the present disclosure includes: a roll body accommodating portion accommodating a roll body on which recording paper is wound; a print head performing printing on the recording paper; a transport unit pulling out the recording paper from the roll body and transporting the recording paper to the print head; a cutting unit cutting the recording paper; a power supply unit supplying a drive voltage signal to the print head, the transport unit, and the cutting unit; and a housing covering the roll body accommodating portion, the print head, the transport unit, the cutting unit, and the power supply unit, in which the power supply unit has a power receiving module receiving a signal based on a power supply voltage signal from an outside by a non-contact power supply, and the power receiving module is fixed to a power supply surface of the housing by an adhesive member.

DESCRIPTION OF EXEMPLARY EMBODIMENTS

Figure 1:
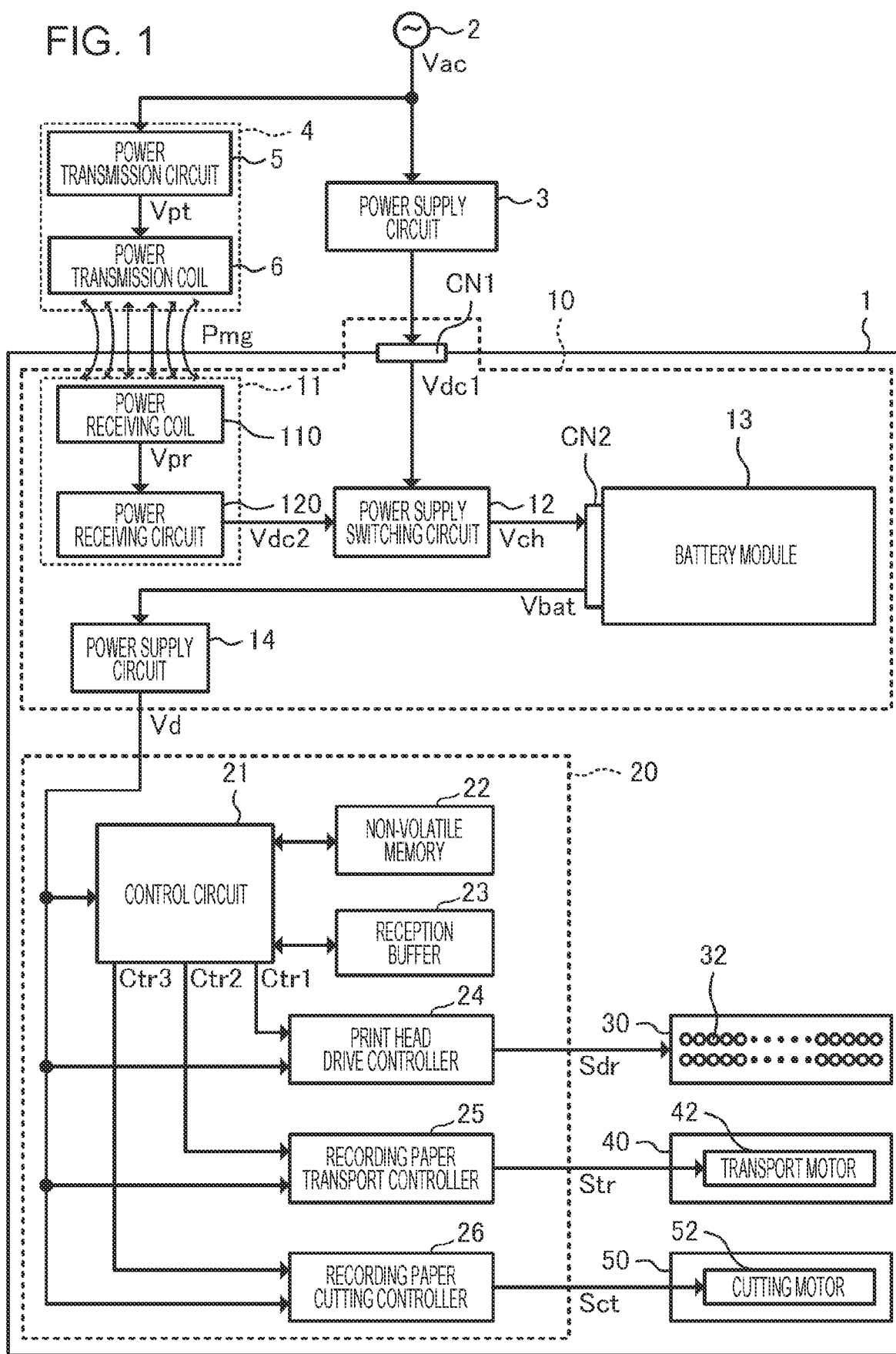
FIG. 1 is a diagram illustrating an electric configuration of a mobile printer.

Hereinafter, preferred embodiments of the present disclosure will be described with reference to drawings. The drawing to be used is for convenience of description. In addition, the embodiments which will be described below do not inappropriately limit the contents of the present disclosure described in the claims. Not all of the configurations which will be described below are necessarily essential components of the present disclosure.

1. Electric Configuration of Mobile Printer

FIG. 1 is a diagram illustrating an electric configuration of a mobile printer 1. In the present embodiment, the mobile printer 1 is a so-called thermal printer that prints desired characters, images, and the like on the recording medium by heat applied to a surface of thermal paper as the recording medium by a thermal head including a plurality of heat generating elements. In addition to the mobile printer 1 of the present embodiment, FIG. 1 also illustrates a commercial power supply 2, a power supply circuit 3, and a power transmission unit 4 as external devices for supplying drive power from the outside of the mobile printer 1.

The commercial power supply 2 generates a power supply voltage signal Vac, which is an alternating voltage of a commercial frequency, and supplies power supply voltage signal Vac to each of the power supply circuit 3 and the power transmission unit 4.

The power supply circuit 3 converts the supplied power supply voltage signal Vac into a direct current (DC) voltage signal Vdc1 having a predetermined voltage value, and supplies the DC voltage signal Vdc1 to the mobile printer 1. That is, the mobile printer 1 is supplied with the drive power according to the DC voltage signal Vdc1. Such a power supply circuit 3 includes, for example, a converter circuit such as a flyback circuit.

The power transmission unit 4 includes a power transmission circuit 5 and a power transmission coil 6. The power transmission circuit 5 converts a frequency of the power supply voltage signal Vac supplied from the power supply circuit 3 into a high-frequency voltage signal of 100 kHz to 250 kHz, and outputs the converted voltage signal to the power transmission coil 6 as a power transmission signal Vpt. Such a power transmission circuit 5 includes, for example, a converter circuit that converts the power supply voltage signal Vac into a DC voltage, and an inverter circuit that converts the DC voltage into a high-frequency power transmission signal Vpt. The power transmission coil 6 outputs a magnetic field Pmg according to the input power transmission signal Vpt. When the mobile printer 1 receives the magnetic field Pmg, the mobile printer 1 is supplied with the drive power according to the magnetic field Pmg.

That is, the mobile printer 1 of the present embodiment can supply the drive power according to the DC voltage signal Vdc1 output by the power supply circuit 3 provided outside the mobile printer 1, and the drive power according to the magnetic field Pmg output by the power transmission unit 4. Then, the mobile printer 1 is driven by the drive power according to the DC voltage signal Vdc1 or the drive power according to the magnetic field Pmg. FIG. 1 illustrates that the drive power may be supplied from both the DC voltage signal Vdc1 output by the power supply circuit 3 and the magnetic field Pmg output by the power transmission unit 4. However, the mobile printer 1 may be supplied with the drive power from either the DC voltage signal Vdc1 output by the power supply circuit 3 or the magnetic field Pmg output by the power transmission unit 4. In addition to the DC voltage signal Vdc1 output by the power supply circuit 3 and the magnetic field Pmg output by the power transmission unit 4, the mobile printer 1 may be further supplied with the drive power by a different method.

As illustrated in FIG. 1, the mobile printer 1 includes a power supply unit 10, a control unit 20, a print head 30, a transport unit 40, and a cutting unit 50.

The power supply unit 10 includes connectors CN1 and CN2, a power receiving module 11, a power supply switching circuit 12, a battery module 13, and a power supply circuit 14.

The DC voltage signal Vdc1 output by the power supply circuit 3 is supplied to the mobile printer 1 via the connector CN1. The DC voltage signal Vdc1 is input to the power supply switching circuit 12. As the connector CN1 to which such a DC voltage signal Vdc1 is supplied, a USB-Type-C receptacle connector having a shape to which a cable conforming to the USB-Type-C standard can be attached is used. That is, the power supply unit 10 has the connector CN1, which is the USB-Type-C receptacle connector to which the DC voltage signal Vdc1 based on the power supply voltage signal Vac is supplied.

Here, in addition to the DC voltage signal Vdc1, a communication signal for communicating between the mobile printer 1 and the external devices conforming to the universal serial bus (USB) standard may be input to the connector CN1, which is the USB-Type-C receptacle connector. In this case, the mobile printer 1 may include a USB communication driver for controlling the communication conforming to the USB standard.

Moreover, the DC voltage signal Vdc1 input to the connector CN1, which is the USB-Type-C receptacle connector, may be a voltage signal conforming to the USB-power delivery (PD) standard and enabling supply of the drive power of 15 W or more. In other words, the connector CN1, which is the USB-Type-C receptacle connector, may input the voltage signal according to the USB-PD standard, and input the power of 15 W or more. In this case, the mobile printer 1 may include a USB-PD driver for controlling the power supply conforming to the USB-PD standard.

The power receiving module 11 receives the magnetic field Pmg output by the power transmission unit 4. The power receiving module 11 generates a DC voltage signal Vdc2 according to the magnetic field Pmg, and outputs the DC voltage signal Vdc2 to the power supply switching circuit 12. Specifically, the power receiving module 11 has a power receiving coil 110 and a power receiving circuit 120. When the magnetic field Pmg is supplied, the power receiving coil 110 generates a high-frequency power reception signal Vpr according to the magnetic field Pmg, and outputs the high-frequency power reception signal Vpr to the power receiving circuit 120. The power receiving circuit 120 rectifies and smoothes the supplied high-frequency power reception signal Vpr, and controls a voltage value, thereby converting the power reception signal Vpr into the DC voltage signal Vdc2 of a predetermined voltage value and supplying the DC voltage signal Vdc2 to the power supply switching circuit 12. That is, the power receiving module 11 includes the power receiving coil 110 that receives the power transmission signal Vpt based on the power supply voltage signal Vac as the power reception signal Vpr in a non-contact manner, and the power receiving circuit 120 that converts the power reception signal Vpr received by the power receiving coil 110 into the DC voltage signal Vdc2. The power receiving module 11 receives a signal based on the power supply voltage signal Vac from the outside of the mobile printer 1 by the non-contact power supply. As a result, the power output by the power transmission unit 4 is transmitted to the mobile printer 1 in a non-contact manner. Here, the power receiving circuit 120 may perform at least one of rectification, smoothing, and voltage value control of the power reception signal Vpr, or may perform all of rectification, smoothing, and voltage value control.

Here, the mobile printer 1 is required to have a small size and light weight from the viewpoint of portability. Therefore, the mobile printer 1 is preferred to perform the non-contact power supply for receiving the power in a non-contact manner by an electromagnetic induction method, from the viewpoint of implementing the small size, light weight, and low costs of the mobile printer 1. The mobile printer 1 is preferred to use a non-contact power supply method that can supply the power of 15 W or more and conforms to a wireless power supply standard Qi 1.2. In other words, the power receiving module 11 of the mobile printer 1 is preferred to receive the power of 15 W or more and according to the wireless power supply standard Qi 1.2. As a result, the non-contact power supply of the mobile printer 1 can be performed without impairing the portability of the mobile printer 1. The non-contact power supply may be referred to as a wireless power supply method, a wireless power charging method, a wireless power transmission method, or the like.

The DC voltage signal Vdc1 supplied via the connector CN1 and the DC voltage signal Vdc2 output by the power receiving circuit 120 are input to the power supply switching circuit 12. The power supply switching circuit 12 outputs one of the DC voltage signals Vdc1 and Vdc2 as a DC voltage signal Vch to the battery module 13 via the connector CN2. Such a power supply switching circuit 12 can include, for example, a wired-OR circuit.

That is, when only the DC voltage signal Vdc1 is input to the power supply switching circuit 12, the power supply switching circuit 12 outputs the DC voltage signal Vdc1 as the DC voltage signal Vch to the battery module 13. When only the DC voltage signal Vdc2 is input to the power supply switching circuit 12, the power supply switching circuit 12 outputs the DC voltage signal Vdc2 as the DC voltage signal Vch to the battery module 13. When the DC voltage signal Vdc1 and the DC voltage signal Vdc2 are input to the power supply switching circuit 12, the power supply switching circuit 12 selects only one of the DC voltage signal Vdc1 and the DC voltage signal Vdc2 or combines the DC voltage signal Vdc1 and the DC voltage signal Vdc2, and outputs the DC voltage signal Vdc1 and/or the DC voltage signal Vdc2 as the DC voltage signal Vch to the battery module 13.

The battery module 13 holds electric charges according to the DC voltage signal Vch based on at least one of the DC voltage signal Vdc1 and the DC voltage signal Vdc2, and a DC voltage signal Vbat according to the held electric charges is output from the connector CN2 to the power supply circuit 14.

Here, in the mobile printer 1 of the present embodiment, as illustrated in FIG. 1, the DC voltage signal Vch output by the power supply switching circuit 12 is input to the battery module 13, and the battery module 13 outputs the DC voltage signal Vbat based on the input DC voltage signal Vch to the power supply circuit 14. That is, the voltage signal output by the power supply switching circuit 12 is input to the power supply circuit 14 via the battery module 13. As a result, the battery module 13 functions as a stabilization circuit that reduces the possibility that the voltage value of the voltage signal supplied to the power supply circuit 14 fluctuates, and stabilizes an operation of the power supply circuit 14. As such a battery module 13, for example, a lithium ion secondary battery can be used.

The power supply circuit 14 generates a drive voltage signal Vd having a predetermined voltage value by boosting or reducing a voltage value of the supplied DC voltage signal Vbat, and outputs the drive voltage signal Vd to the control unit 20. Here, FIG. 1 illustrates that the power supply circuit 14 generates a single drive voltage signal Vd and outputs the drive voltage signal Vd to the control unit 20. However, the power supply circuit 14 may generate a plurality of drive voltage signals Vd according to an operating voltage of the control unit 20 having a configuration to which the drive voltage signal Vd is supplied, and output the plurality of drive voltage signals Vd to the control unit 20 having the corresponding configuration.

The electric configuration of the power supply unit 10 is not limited to the configuration in FIG. 1. For example, the power supply switching circuit 12 to which the DC voltage signals Vdc1 and Vdc2 are input may detect the voltage value of the DC voltage signal Vbat output by the battery module 13 to estimate an amount of electric charges stored in the battery module 13. When it is determined that the sufficient electric charges are stored in the battery module 13, the power supply switching circuit 12 may output the supplied DC voltage signals Vdc1 and Vdc2 to the power supply circuit 14 without through the battery module 13. When it is determined that the insufficient electric charges are stored in the battery module 13, the power supply switching circuit 12 may output the DC voltage signals Vdc1 and Vdc2 to both the battery module 13 and the power supply circuit 14, thereby charging the battery module 13 in parallel with supplying the voltage signals to the power supply circuit 14. Further, when both the DC voltage signals Vdc1 and Vdc2 are not supplied to the power supply switching circuit 12, the power supply switching circuit 12 may output the DC voltage signal Vbat output by the battery module 13 to the power supply circuit 14.

That is, depending on the amount of electric charges stored in the battery module 13 and presence/absence of supply of the DC voltage signals Vdc1 and Vdc2, the power supply switching circuit 12 may perform whether to switch the voltage signal supplied to the power supply circuit 14 to the DC voltage signal Vdc1, the DC voltage signal Vdc2, or the DC voltage signal Vbat.

The control unit 20 includes a control circuit 21, a non-volatile memory 22, a reception buffer 23, a print head drive controller 24, a recording paper transport controller 25, and a recording paper cutting controller 26.

The control circuit 21 includes a central processing unit (CPU) (not illustrated), read only memory (ROM), random access memory (RAM), and other peripheral circuits. The drive voltage signal Vd output by the power supply unit 10 and print data (not illustrated) including image information formed on the recording medium are input to the control circuit 21. The control circuit 21 drives the drive voltage signal Vd as an operating voltage, and controls, based on the print data, each unit of the mobile printer 1 including the non-volatile memory 22, the reception buffer 23, the print head drive controller 24, the recording paper transport controller 25, and the recording paper cutting controller 26.

The non-volatile memory 22 includes a semiconductor storage element such as electrically erasable programmable read-only memory (EEPROM) or a flash memory, and a storage medium such as a hard disk. Various data are rewritably stored in the non-volatile memory 22 under the control of the control circuit 21.

The reception buffer 23 includes a temporary storage area such as RAM, and is composed of, for example, a semiconductor storage device. Under the control of the control circuit 21, various information such as commands related to printing such as print data are stored in the reception buffer 23.

A control signal Ctr1 generated by the control circuit 21 based on the print data and the drive voltage signal Vd output by the power supply unit 10 are input to the print head drive controller 24. The print head drive controller 24 generates a head drive signal Sdr based on the drive voltage signal Vd at a timing defined by the control signal Ctr1, and outputs the head drive signal Sdr to the print head 30. That is, the drive voltage signal Vd output by the power supply unit 10 is supplied to the print head 30 via the control unit 20. In other words, the power supply unit 10 supplies the drive voltage signal Vd to the print head 30 via the control unit 20. The print head 30 includes a plurality of resistors 32 provided side by side along a direction orthogonal to a transporting direction of the recording medium. The head drive signal Sdr output by the print head drive controller 24 is supplied to each of the plurality of resistors 32, so that the resistors 32 generate heat.

A control signal Ctr2 generated by the control circuit 21 based on the print data and the drive voltage signal Vd output by the power supply unit 10 are input to the recording paper transport controller 25. The recording paper transport controller 25 generates a medium transport signal Str based on the drive voltage signal Vd at a timing defined by the control signal Ctr2, and outputs the medium transport signal Str to the transport unit 40. That is, the drive voltage signal Vd output by the power supply unit 10 is supplied to the transport unit 40 via the control unit 20. In other words, the power supply unit 10 supplies the drive voltage signal Vd to the transport unit 40 via the control unit 20. The transport unit 40 includes a transport motor 42 for transporting the recording medium in the transporting direction. The medium transport signal Str output by the recording paper transport controller 25 is supplied to the transport motor 42 to drive the transport motor 42, and as the transport motor 42 is driven, the recording medium is transported along a predetermined transporting direction.

A control signal Ctr3 generated by the control circuit 21 based on the print data and the drive voltage signal Vd output by the power supply unit 10 are input to the recording paper cutting controller 26. The recording paper cutting controller 26 generates a medium cutting signal Sct based on the drive voltage signal Vd at a timing defined by the control signal Ctr3, and outputs the medium cutting signal Sct to the cutting unit 50. That is, the drive voltage signal Vd output by the power supply unit 10 is supplied to the cutting unit 50 via the control unit 20. In other words, the power supply unit 10 supplies the drive voltage signal Vd to the cutting unit 50 via the control unit 20. The cutting unit 50 includes a cutting motor 52 for cutting the recording medium at a predetermined timing. The medium cutting signal Sct output by the recording paper cutting controller 26 is supplied to the cutting motor 52 to drive the cutting motor 52, and as the cutting motor 52 is driven, a movable blade 56, which will be described below, is driven so as to slide toward a fixing blade 54 to be described below. As a result, the recording medium is pressed against the fixing blade 54, and the recording medium is cut to a predetermined size.

In the mobile printer 1 configured as described above, the control circuit 21 starts operation based on the drive voltage signal Vd output by the power supply unit 10. The control circuit 21 generates the control signals Ctr1, Ctr2, and Ctr3 based on the input print data, and outputs the control signals Ctr1, Ctr2, and Ctr3 to the print head drive controller 24, the recording paper transport controller 25, and the recording paper cutting controller 26, respectively.

Accordingly, the recording medium is transported along the transporting direction, and the resistor 32 generates heat in synchronization with the transport of the recording medium. As a result, the heat is applied to a desired position on the recording medium, and desired characters, images, and the like are formed on the recording medium. The recording medium on which characters, images, and the like are formed is cut to a predetermined size. As a result, the recording medium having a predetermined size on which the desired characters, images, and the like are formed is discharged from the mobile printer 1.

As described above, the mobile printer 1 of the present embodiment includes the print head 30 that performs printing on the recording medium, the transport unit 40 that transports the recording medium to the print head 30, the cutting unit 50 that cuts the recording medium, the control unit 20 that controls operations of the print head 30, the transport unit 40, and the cutting unit 50, and the power supply unit 10 that supplies the drive voltage signal Vd to the print head 30, the transport unit 40, and the cutting unit 50. Under the control of the control unit 20, the transport unit 40 transports the recording medium to the print head 30, and the print head 30 supplies heat to the transported recording medium. As a result, a desired image is formed on the recording medium, which is thermal paper. Thereafter, the recording medium on which the image is formed is cut to a desired size by the cutting unit 50. As a result, the recording medium having a desired size on which the image is formed is discharged from the mobile printer 1.

2. Structure of Mobile Printer

Figure 2:
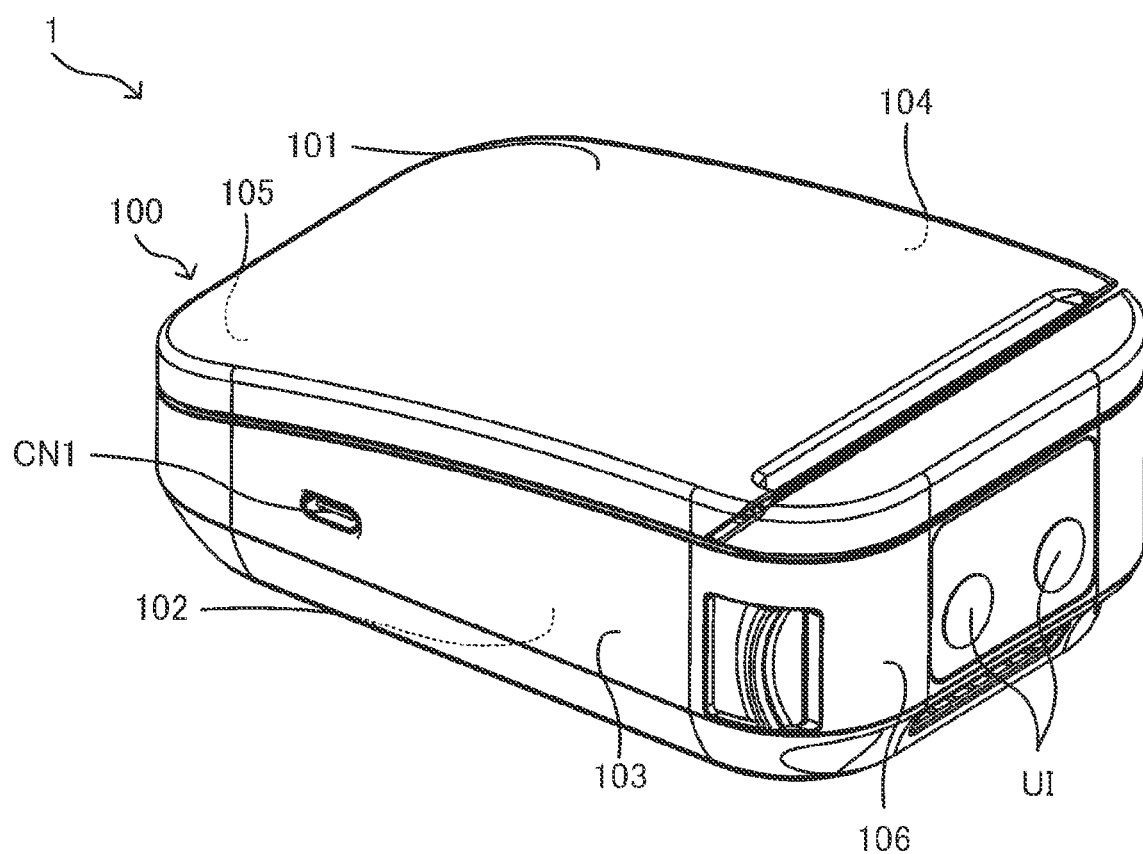
FIG. 2 is a perspective view of the mobile printer when a surface is closed.
Figure 3:
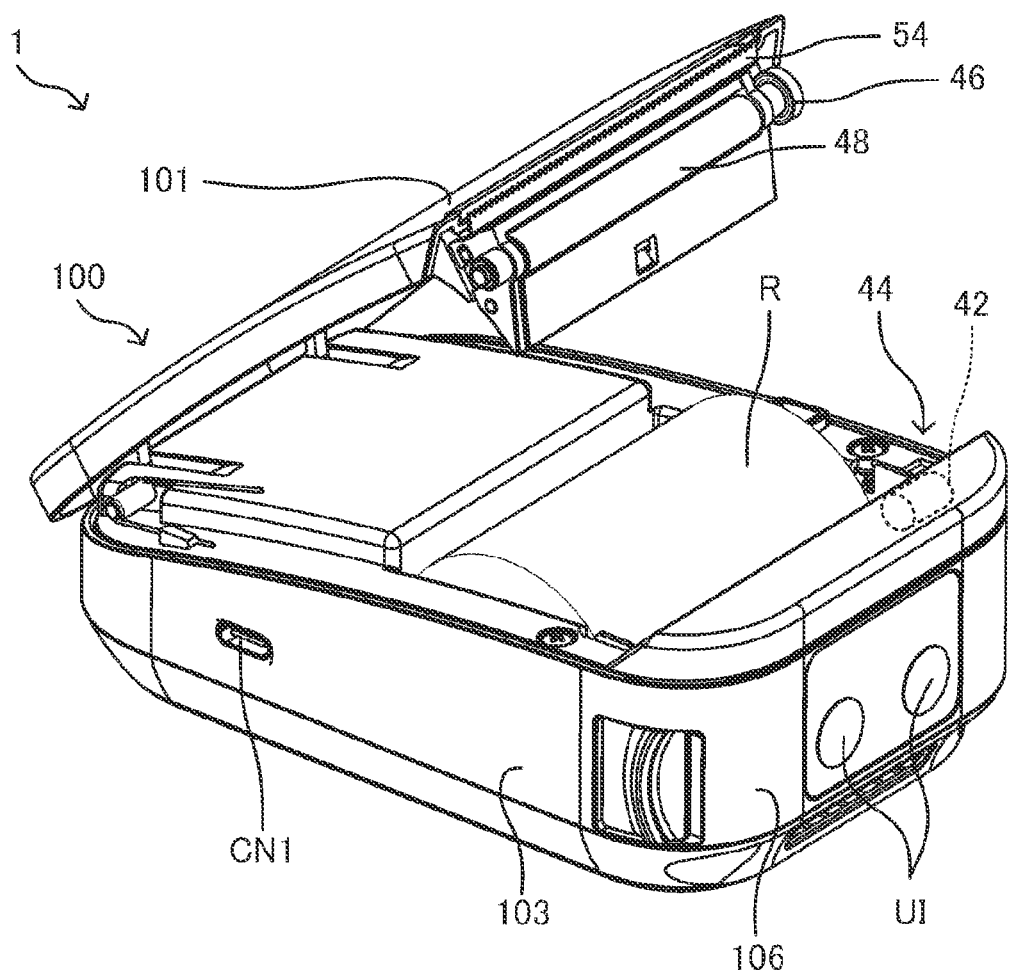
FIG. 3 is a perspective view of the mobile printer when the surface is open.

Next, a structure of the mobile printer 1 will be described. FIG. 2 is a perspective view of the mobile printer 1 when a surface 101 is closed, and FIG. 3 is a perspective view of the mobile printer 1 when the surface 101 is open. Here, in the following description, an X direction, a Y direction, and a Z direction that are orthogonal to each other will be used. In the following description, a starting point side of an arrow indicating the X direction illustrated in the drawings may be referred to as a −X side and a tip end side thereof may be referred to as a +X side, a starting point side of an arrow indicating the Y direction in the drawings may be referred to as a −Y side and a tip end side thereof may be referred to as a +Y side, and a starting point side of an arrow indicating the Z direction in the drawing may be referred to as a −Z side and a tip end side thereof may be referred to as a +Z side.

As illustrated in FIGS. 2 and 3, the mobile printer 1 has a housing 100. The housing 100 includes surfaces 101 and 102 located facing each other in a direction along the Z direction, surfaces 103 and 104 located facing each other in a direction along the Y direction, and surfaces 105 and 106 located facing each other in a direction along the X direction. Specifically, in the housing 100, the surfaces 101 and 102 are located facing each other so that the surface 101 is located on −Z side and the surface 102 is located on the +Z side in the direction along the Z direction, the surfaces 103 and 104 are located facing each other so that the surface 103 is located on the −Y side and the surface 104 is located on the +Y side in the direction along the Y direction, and the surfaces 105 and 106 are located facing each other so that the surface 105 is located on the +X side and the surface 106 is located on the −X side in the direction along the X direction. As a result, the surfaces 101, 102, 103, 104, 105, and 106 form an accommodation space for accommodating various components inside the housing 100. The surface 101 is rotatably provided with an end portion on the +X side as a rotation axis. As a result, a part of the accommodation space including the surfaces 101, 102, 103, 104, 105, and 106 can be opened and closed. In the following description herein, the accommodation space including the surfaces 101, 102, 103, 104, 105, and 106 may be referred to as an accommodation space of the housing 100.

As illustrated in FIG. 3, a roll body R is accommodated in the accommodation space of the housing 100. The roll body R is so-called roll paper on which the recording medium described above is wound, and in the present embodiment, is thermal roll paper on which thermal paper as the recording medium is wound. In the following description herein, the recording medium including the roll body R may be referred to as recording paper P.

As illustrated in FIG. 3, a platen roller 48 and a gear 46 are provided on an end portion of the surface 101 on the −X side. The platen roller 48 includes a rotation axis along the Y direction and is rotatably provided. The gear 46 is fixed to an end portion of the platen roller 48 on the +Y side. When the surface 101 closes the accommodation space of the housing 100, the platen roller 48 and the gear 46 configured as described above are accommodated in the accommodation space. In this case, the gear 46 is inserted through an opening portion 44 of the housing 100, and comes into contact with the transport motor 42 accommodated in the accommodation space of the housing 100. As a result, when the transport motor 42 is driven by the medium transport signal Str output by the control unit 20, the drive force is transmitted to the platen roller 48 via the gear 46 to drive the platen roller 48.

As illustrated in FIGS. 2 and 3, an operation section UI is located on the surface 106 of the housing 100. The operation section UI functions as a user interface for receiving operation information of a user. The user operates the operation section UI, thereby performing a predetermined operation including a printing process by the mobile printer 1.

Moreover, the connector CN1 is located on the surface 103 of the housing 100 so as to expose at least a part thereof to the outside of the housing 100. As described above, the connector CN1 is the USB-Type-C receptacle connector, and the DC voltage signal Vdc1 as drive power is supplied to the mobile printer 1. In addition, when the connector CN1 enables USB communication conforming to the USB-Type-C communication standard, the mobile printer 1 is communicably connected to an external device such as a host computer via the connector CN1. As a result, the user causes the mobile printer 1 to perform a predetermined operation including the printing process, by an operation of the external device that is communicably connected via the connector CN1, in addition to the above-described operation of the operation section UI.

Figure 4:
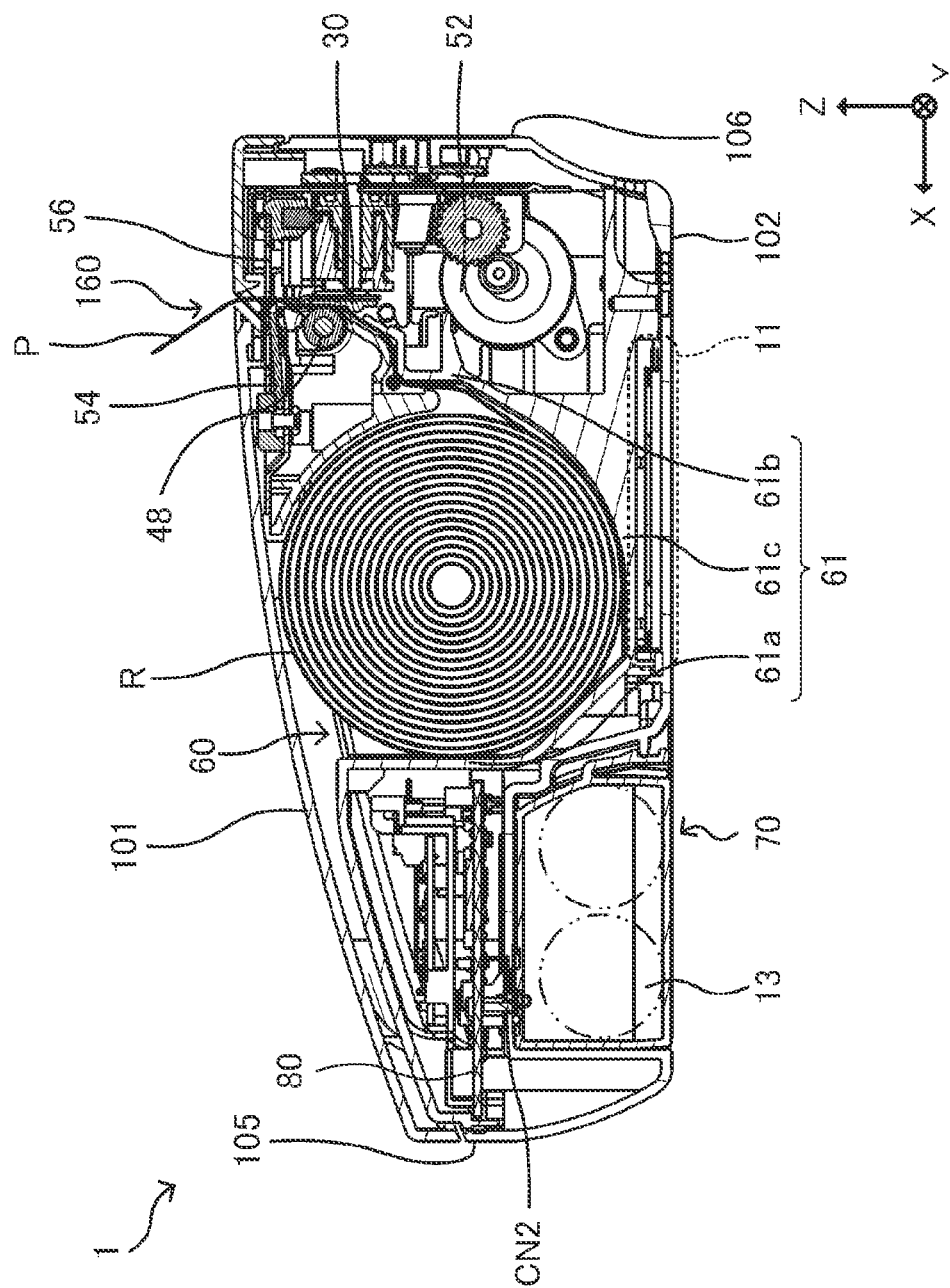
FIG. 4 is a cross-sectional view illustrating an example of an internal structure of the mobile printer.

Next, an example of an internal structure of the mobile printer 1 will be described. FIG. 4 is a cross-sectional view illustrating an example of an internal structure of the mobile printer 1. As illustrated in FIG. 4, the accommodation space of the housing 100 is accommodated with a wiring substrate 80, the platen roller 48, the print head 30, the cutting motor 52, the fixing blade 54, the movable blade 56, the power receiving module 11, and a roll body accommodating portion 60.

The wiring substrate 80 is located in a region of the accommodation space of the housing 100 on the +X side and in the vicinity of the surface 105 of the housing 100. The wiring substrate 80 is provided with various circuits and electronic components, the various circuits including the power supply switching circuit 12 and the power supply circuit 14 included in the power supply unit 10, or the control circuit 21, the non-volatile memory 22, the reception buffer 23, the print head drive controller 24, the recording paper transport controller 25, and the recording paper cutting controller 26, which are included in the control unit 20. That is, the control unit 20 is provided in the wiring substrate 80. Although in the present embodiment, the wiring substrate 80 includes one substrate, the wiring substrate 80 may include a plurality of substrates.

The platen roller 48, the print head 30, the cutting motor 52, the fixing blade 54, and the movable blade 56 are located in a region of the accommodation space of the housing 100 on the −X side and in the vicinity of the surface 106 of the housing 100.

Specifically, the platen roller 48 is located on an end portion of the surface 101 on the −X side, and the rotation axis is provided in substantially parallel to the Y direction. Further, the print head 30 is located facing the platen roller 48 in the −X side of the platen roller 48. Recording paper P wound around the roll body R is pinched between the platen roller 48 and the print head 30 which are located facing each other.

Here, as described above, the platen roller 48 is driven as the transport motor 42 is driven. Therefore, the recording paper P pinched between the platen roller 48 and the print head 30 is transported so as to be pulled out from the roll body R as the platen roller 48 is driven. The recording paper P pulled out from the roll body R is discharged from a discharge port 160 located in the housing 100 on the +Z side to the outside of the mobile printer 1. That is, the transport motor 42, the gear 46, and the platen roller 48 pull out the recording paper P from the roll body R, and transport the recording paper P toward the discharge port 160 via the print head 30. The configuration including the transport motor 42, the gear 46, and the platen roller 48 corresponds to the transport unit 40 described above. In other words, the transport unit 40 pulls out the recording paper P from the roll body R and transports the recording paper P to the print head 30.

The fixing blade 54 and the movable blade 56 are disposed on an upstream of the platen roller 48 and the print head 30 and on a downstream of the discharge port 160 along the transporting direction of the recording paper P. In this case, a transport path through which the recording paper P is transported is located between the fixing blade 54 and the movable blade 56. Specifically, the fixing blade 54 and the movable blade 56 are located on the +Z side of the platen roller 48 and the print head 30 and on the −Z side of the discharge port 160. In this case, the fixing blade 54 is located on the +X side of the transport path of the recording paper P, and the movable blade 56 is located on the −X side of the transport path of the recording paper P.

The cutting motor 52 is located in the vicinity of the movable blade 56. The cutting motor 52 is driven by supplying the medium cutting signal Sct output by the recording paper cutting controller 26. As the cutting motor 52 is driven, the movable blade 56 slides toward the fixing blade 54 so as to appropriately rub against the fixing blade 54. As a result, the recording paper P transported along the transport path located between the fixing blade 54 and the movable blade 56 is pressed against the fixing blade 54. As a result, the recording paper P is cut. Thereafter, the cut recording paper P is discharged to the outside of the mobile printer 1 through the discharge port 160. That is, the cutting motor 52, the fixing blade 54, and the movable blade 56 cut the recording paper P transported by the transport unit 40. The configuration including the cutting motor 52, the fixing blade 54, and the movable blade 56 corresponds to the cutting unit 50 described above. The movable blade 56 presses the recording paper P against the fixing blade 54 so that the cutting unit 50 cuts the recording paper P.

Here, when the cutting unit 50 cuts the recording paper P, the recording paper P may be pressed against only one of the fixing blade 54 or the movable blade 56. Therefore, the cutting unit 50 may be configured to press the recording paper P against either the fixing blade 54 or the movable blade 56 by applying a force by the user or the like. That is, the recording paper P is pressed against the fixing blade 54 or the movable blade 56 so that the cutting unit 50 may cut the recording paper P. When the cutting unit 50 has the above-described configuration, the cutting unit 50 may be configured to include only one of the fixing blade 54 or the movable blade 56.

Here, the fixing blade 54 and the movable blade 56 repeatedly cut the recording paper P. Therefore, the fixing blade 54 and the movable blade 56 are required to maintain high cutting performance even when the fixing blade 54 and the movable blade 56 are repeatedly pressed against the recording paper P. Such a fixing blade 54 and a movable blade 56 are preferably made of a metal having strength and properties suitable for the blade and capable of easily processing a blade edge suitable for the blade, for example, are preferably made of iron, steel, stainless steel, and the like. In addition, the fixing blade 54 and the movable blade 56 may have a shape capable of cutting the recording paper P when the recording paper P is pressed against the fixing blade 54 and the movable blade 56, and the blade edges of the fixing blade 54 and the movable blade 56 may have a linear shape or a sawtooth shape. The blade edges of the fixing blade 54 and the movable blade 56 have a linear shape, the possibility that paper dust is thus generated on the cut surface of the recording paper P is reduced. On the other hand, the blade edge of the fixing blade 54 or the movable blade 56 has a sawtooth shape, the fixing blade 54 or the movable blade 56 can thus cut the recording paper P with a small force, and the convenience of the user is improved.

The roll body R around which the recording paper P is wound is housed in the roll body accommodating portion 60 in a drop-in manner. Such a roll body accommodating portion 60 includes a partition wall portion 61, and is located between the wiring substrate 80 and the platen roller 48, the print head 30, the cutting motor 52, the fixing blade 54, and the movable blade 56 in the direction along the X direction. Specifically, the roll body accommodating portion 60 is composed of partition wall portions 61a, 61b, and 61c which are a part of the partition wall portion 61. The roll body accommodating portion 60 is provided in the accommodation space of the housing 100 so that, in a state in which the roll body R is accommodated, the partition wall portion 61a, which is a part of the partition wall portion 61, is located between the accommodated roll body R and the wiring substrate 80, the partition wall portion 61b, which is a part of the partition wall portion 61, is located between the accommodated roll body R and the cutting motor 52, and the partition wall portion 61c, which is a part of the partition wall portion 61, is located between the accommodated roll body R and the surface 102.

Here, among the partition wall portions 61 of the roll body accommodating portion 60, the partition wall portion 61c located between the accommodated roll body R and the cutting motor 52 is composed of a part of the transport path through which the recording paper P is transported. As a result, it is possible to reduce the size of the mobile printer 1.

The power receiving module 11 is located in a region of the accommodation space of the housing 100 on the −Z side and in the vicinity of the surface 102 of the housing 100. Specifically, the power receiving module 11 is located between the partition wall portion 61c and the surface 102 on the −Z side of the roll body accommodating portion 60, and is fixed to the surface 102. In this case, at least a part of the power receiving module 11 is located so as to overlap with the roll body accommodating portion 60 along the Z direction, which is a direction along a direction from the surface 102 to the power receiving module 11, and at least a part of the partition wall portion 61c, which is a part of the partition wall portion 61, is located between the power receiving module 11 and the roll body accommodating portion 60 along the Z direction which is a direction from the power receiving module 11 to the roll body accommodating portion 60.

In the mobile printer 1 of the present embodiment, the power receiving module 11 is located so as not to overlap with the wiring substrate 80 having the control unit 20 along the Z direction, which is a direction along the direction from the surface 102 to the power receiving module 11. That is, the power receiving coil 110 of the power receiving module 11 is located so as not to overlap with the wiring substrate 80 having the control unit 20 along the Z direction, which is a direction along the direction from the surface 102 to the power receiving module 11.

The power receiving coil 110 receives the magnetic field Pmg based on the high-frequency power transmission signal Vpt output by the power transmission unit 4. That is, the magnetic field Pmg is formed around the power receiving coil 110. When such a magnetic field Pmg contributes to the control unit 20, the operation of the mobile printer 1 becomes unstable and a printing accuracy deteriorates. To solve such a problem, the power receiving coil 110 in which the magnetic field Pmg can be particularly concentrated and the wiring substrate 80 having the control unit 20 are disposed so as not to overlap each other along the Z direction in the power receiving module 11, such that the possibility that the magnetic field Pmg that can be generated around the power receiving coil 110 contributes to the control unit 20 can be reduced.

Moreover, the power receiving coil 110 of the power receiving module 11 is more preferably located so as not to overlap with the power receiving coil 110 and the electronic components of the mobile printer 1 along the Z direction, which is a direction along the direction from the surface 102 to the power receiving module 11. As a result, the possibility that the magnetic field Pmg that can be generated around the power receiving coil 110 contributes to the various electronic components of the mobile printer 1 can be reduced. Here, the electronic components of the mobile printer 1 located so as not to overlap with the power receiving coil 110 are electronic components other than electronic components of the power receiving module 11. In the present embodiment, the electronic components of the mobile printer 1 are composed of various circuits provided on the wiring substrate 80, and include resistor elements, which are components to which the voltage signals are input, passive components such as condenser elements and inductance elements, and active components such as diodes or transistors.

A specific example of the configuration of the power receiving module 11 and its arrangement in the housing 100, and a specific example of a method for fixing the power receiving module 11 to the housing 100 will be described below.

As illustrated in FIG. 4, the housing 100 has a battery accommodating portion 70 in which the battery module 13 is accommodated. The battery accommodating portion 70 is a recessed space that is located on the +X side from the power receiving module 11 and on the −Z side of the wiring substrate 80, formed in a part of the surface 102, and opened to the −Z side. That is, the battery accommodating portion 70 is provided outside the housing 100. Therefore, the surface 102 constituting the battery accommodating portion 70 is interposed between the battery module 13 accommodated in the battery accommodating portion 70 and the wiring substrate 80 accommodated in the accommodation space of the housing 100, the power receiving module 11, and the roll body accommodating portion 60. In other words, the surface 102 is located between the battery module 13 and the wiring substrate 80, the surface 102 is located between the battery module 13 and the power receiving module 11, and the surface 102 is located between the battery module 13 and the roll body accommodating portion 60.

Moreover, a part of the connector CN2 of the wiring substrate 80 is exposed to a side surface of the battery accommodating portion 70 on the +Z side. When the battery module 13 is accommodated in the battery accommodating portion 70, an electrode (not illustrated) of the battery module 13 and the connector CN2 are electrically coupled to each other. As a result, the wiring substrate 80 and the battery module 13 are electrically coupled via the connector CN2.

As described above, in the mobile printer 1, the accommodation space formed inside the housing 100 accommodates the roll body accommodating portion 60, the print head 30, the transport unit 40, the power supply unit 10 including the power receiving module 11, and the control unit 20 of the wiring substrate 80, and the battery accommodating portion 70 provided outside the housing 100 accommodates the battery module 13. In other words, the housing 100 includes the surfaces 101, 102, 103, 104, 105, and 106, and is provided so as to cover the roll body accommodating portion 60, the print head 30, the transport unit 40, the cutting unit 50, at least a part of the power supply unit 10, and the control unit 20. As a result, the possibility that the housing 100 has an external impact on the roll body accommodating portion 60, the print head 30, the transport unit 40, the cutting unit 50, and the power supply unit 10, which are provided in the mobile printer 1, is reduced.

In such a mobile printer 1, the roll body accommodating portion 60, the print head 30, the transport unit 40, the cutting unit 50, and the control unit 20 accommodated in the accommodation space of the housing 100 are configured so that the control unit 20 is located in the vicinity of the surface 105, the print head 30, the transport unit 40, and the cutting unit 50 are located in the vicinity of the surface 106, and the roll body accommodating portion 60 is located between the control unit 20, the print head 30, the transport unit 40, and the cutting unit 50 in a direction along a direction from the surface 105 to the surface 106. That is, the roll body accommodating portion 60, the transport unit 40, and the control unit 20 are located in this order of the control unit 20, the roll body accommodating portion 60, and the transport unit 40 in the direction along the direction from the surface 105 to the surface 106, the roll body accommodating portion 60, the cutting unit 50, and the control unit 20 are located in this order of the control unit 20, the roll body accommodating portion 60, and the cutting unit 50 in the direction along the direction from the surface 105 to the surface 106, and the roll body accommodating portion 60, the print head 30, and the control unit 20 are located in this order of the control unit 20, the roll body accommodating portion 60, and the print head 30 in the direction along the direction from the surface 105 to the surface 106. In other words, a shortest distance between the control unit 20 and the surface 105 is shorter than a shortest distance between the control unit 20 and the surface 106, a shortest distance between the transport unit 40 and the surface 105 is longer than a shortest distance between the transport unit 40 and the surface 106, a shortest distance between the cutting unit 50 and the surface 105 is longer than a shortest distance between the cutting unit 50 and the surface 106, and a shortest distance between the print head 30 and the surface 105 is longer than a shortest distance between the print head 30 and the surface 106.

As a result, the head drive signal Sdr, the medium transport signal Str, and the medium cutting signal Sct output by the control unit 20 are all transmitted from a side of the surface 105 to a side of the surface 106 in the accommodation space in the housing 100. Therefore, the possibility that noise is superimposed on the head drive signal Sdr, the medium transport signal Str, and the medium cutting signal Sct is reduced, and the possibility of malfunctions of the mobile printer 1 is reduced by mutually canceling the head drive signal Sdr, the medium transport signal Str, and the medium cutting signal Sct.

3. Fixing of Power Receiving Module 11 to Housing 100

Figure 5:
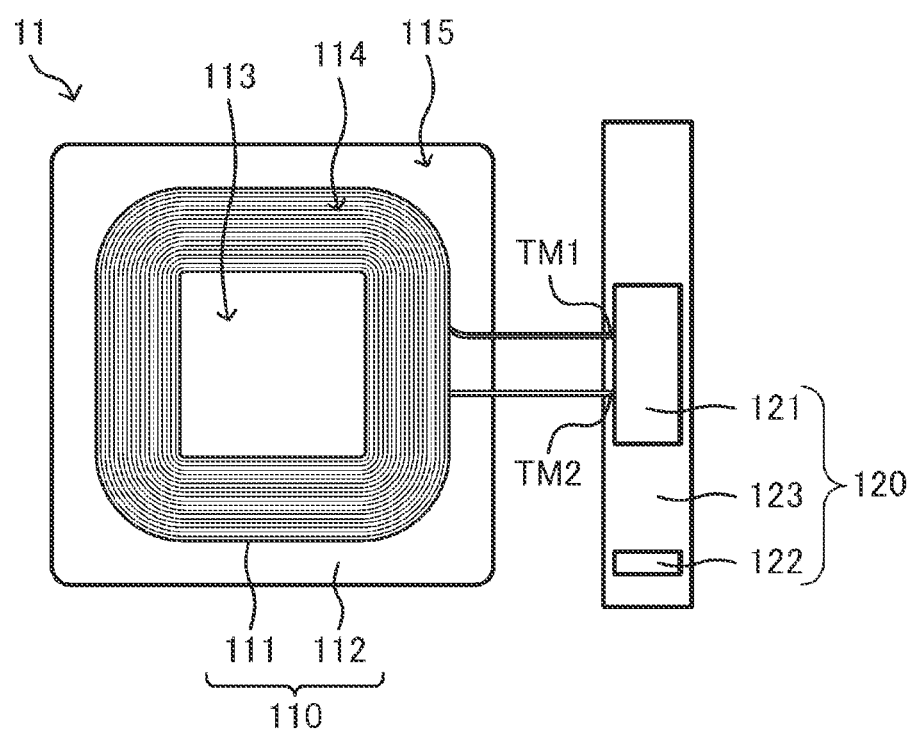
FIG. 5 is a diagram illustrating an example of a structure of a power receiving module.

Next, a specific example of a method for fixing the power receiving module 11 to the housing 100 will be described. In describing the specific example of the method for fixing the power receiving module 11 to the housing 100, first, a specific example of a structure of the power receiving module 11 will be described with reference to FIG. 5. FIG. 5 is a diagram illustrating an example of a structure of the power receiving module 11. As illustrated in FIG. 5, the power receiving module 11 includes the power receiving coil 110 and the power receiving circuit 120.

The power receiving coil 110 receives, as the power reception signal Vpr in a non-contact manner, the magnetic field Pmg according to the power transmission signal Vpt based on the power supply voltage signal Vac from the power transmission unit 4 that is provided outside the mobile printer 1. Such a power receiving coil 110 has an annular coil 111 in which the power reception signal Vpr according to the magnetic field Pmg is transmitted, and a mold member 112 provided so as to cover the annular coil 111.

The annular coil 111 includes a conductor, such as copper, formed in an annular shape, and an end portion TM1 on one end of the conductor and an end portion TM2 on the other end thereof are electrically coupled to the power receiving circuit 120. A current according to the magnetic field Pmg generated around the annular coil 111 flows through annular coil 111. That is, a potential difference generated according to the current is generated between the end portion TM1 and the end portion TM2 of the annular coil 111. The power receiving coil 110 outputs the potential difference generated between the end portion TM1 and the end portion TM2 of the annular coil 111 to the power receiving circuit 120 as the power reception signal Vpr.

The mold member 112 provided so as to cover the annular coil 111 maintains a shape of the annular coil 111, and functions as an insulator that may reduce abnormal short circuit generated between each configuration of the mobile printer 1 and the annular coil 111 due to the impact generated by the annular coil 111 coming into contact with each unit of the mobile printer 1. As a result, the possibility of changes in characteristics of the annular coil 111 is reduced, and power receiving sensitivity of the magnetic field Pmg by the power receiving coil 110 is improved.

Such a power receiving coil 110 includes a coil region 114 in which the annular coil 111 through which the power reception signal Vpr is transmitted is located, a coil inner region 113 located inside the coil region 114, and a coil outer region 115 located outside the coil region 114.

The power receiving circuit 120 converts the power reception signal Vpr output by the power receiving coil 110 into the DC voltage signal Vdc2 and outputs the DC voltage signal Vdc2. Specifically, the power receiving circuit 120 includes a voltage conversion circuit 121, a connector 122, and a wiring substrate 123 having the voltage conversion circuit 121 and the connector 122.

The voltage conversion circuit 121 includes a rectifier circuit that rectifies the high-frequency power reception signal Vpr, a smoothing circuit that smoothes a rectified voltage output by the rectifier circuit, a transformation circuit that transforms a voltage value of a smoothed voltage output by the smoothing circuit into a predetermined voltage value to output the voltage value as the DC voltage signal Vdc2, and the like. The DC voltage signal Vdc2 output by the voltage conversion circuit 121 is transmitted through the wiring substrate 123, and output from the power receiving module 11 via the connector 122.

In the power receiving module 11 as described above, the power receiving coil 110 receives the voltage signal based on the magnetic field Pmg, and outputs the power reception signal Vpr according to the magnetic field Pmg to the power receiving circuit 120. The power receiving circuit 120 generates the DC voltage signal Vdc2 of the predetermined voltage value from the power reception signal Vpr output by the power receiving coil 110, and outputs the DC voltage signal Vdc2 from the connector 122.

The power receiving module 11 configured as described above receives, in a non-contact manner, the magnetic field Pmg output by the power transmission unit 4 provided outside the mobile printer 1. Therefore, the fixing position and fixing method of the power receiving module 11 in the mobile printer 1 are particularly important, from the viewpoint of enhancing a power receiving efficiency in the power receiving module 11 and reducing the possibility that the magnetic field Pmg contributes to the operation of the mobile printer 1.

Figure 6:
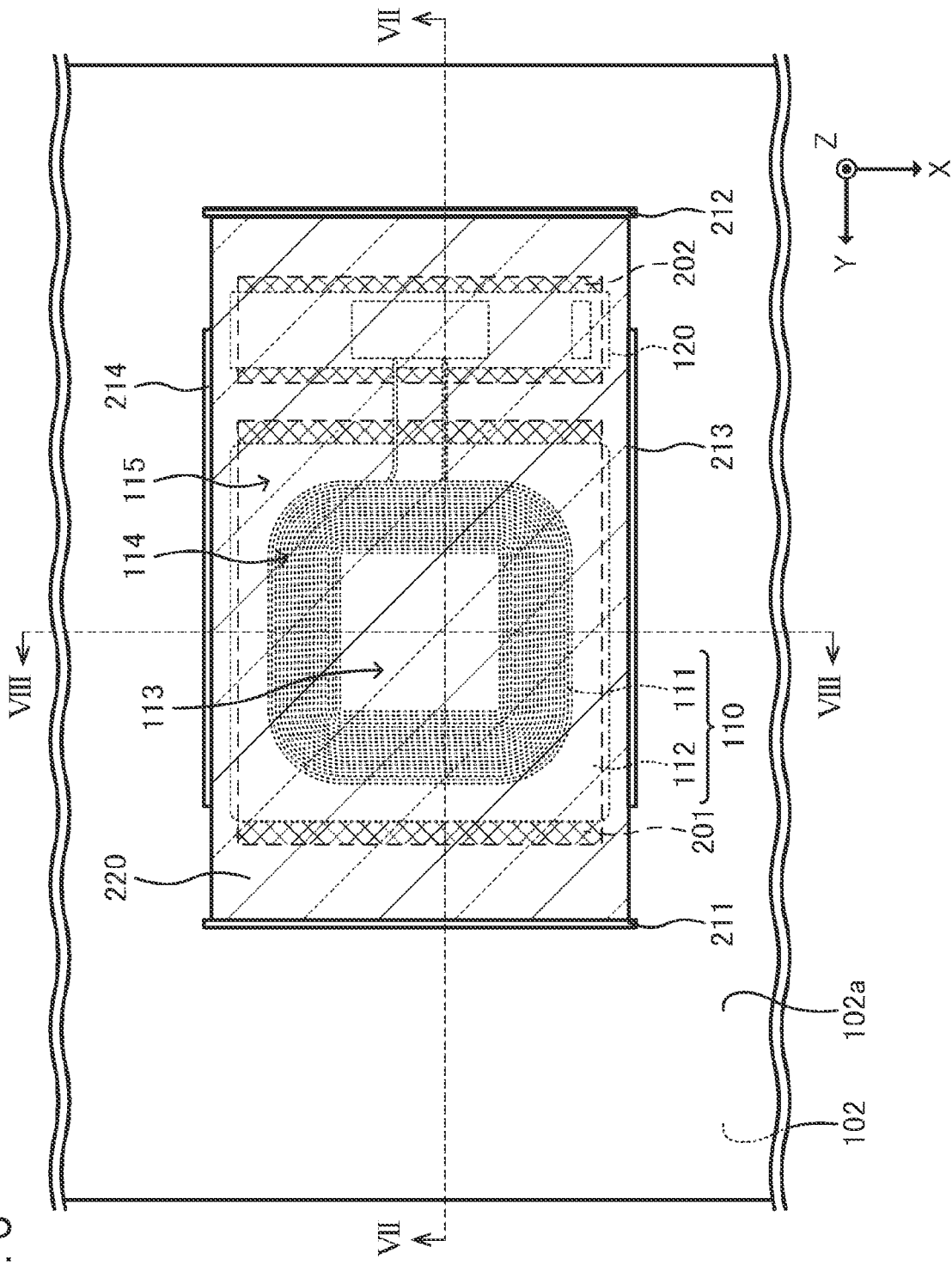
FIG. 6 is a diagram illustrating an example of a method for fixing the power receiving module when the mobile printer is viewed from a +Z side to a −Z side along a Z direction.
Figure 7:
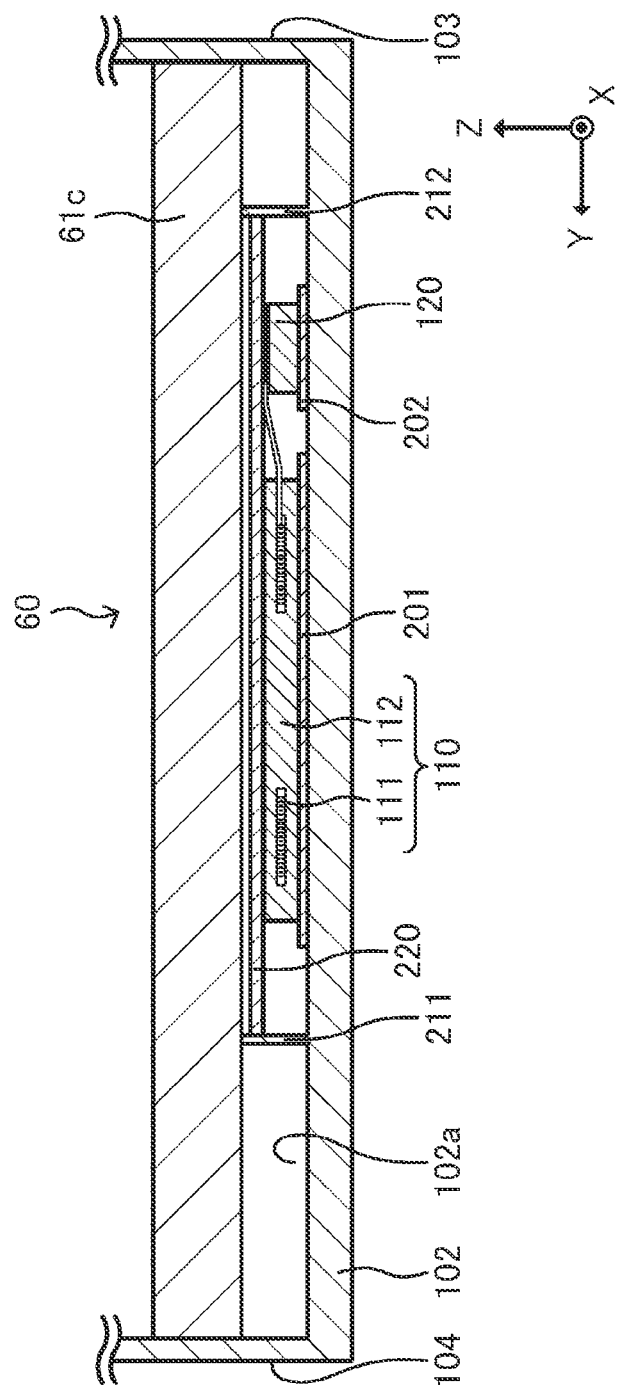
FIG. 7 is a VII-VII cross-sectional view illustrating the example of the method for fixing the power receiving module illustrated in FIG. 6.
Figure 8:
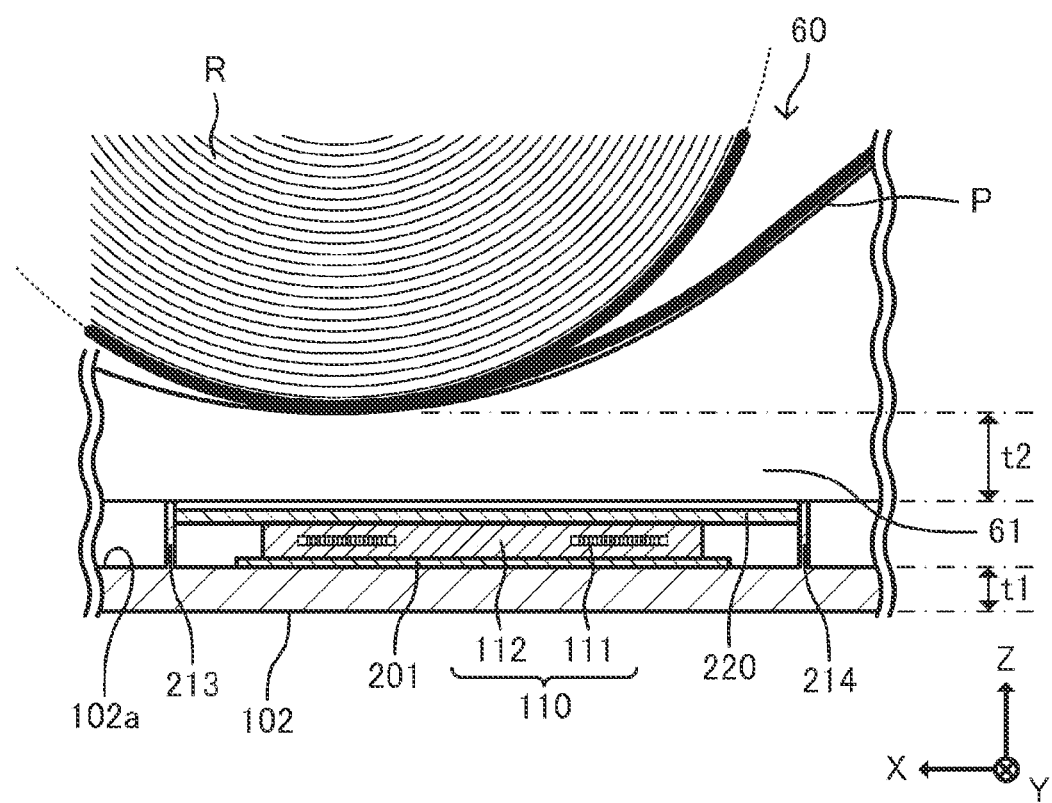
FIG. 8 is a VIII-VIII cross-sectional view illustrating the example of the method for fixing the power receiving module illustrated in FIG. 6.

Next, specific examples of the fixing position and fixing method of the power receiving module 11 to the housing 100 of the mobile printer 1 will be described with reference to FIGS. 6 to 8. FIG. 6 is a diagram illustrating an example of a method for fixing the power receiving module 11 when the mobile printer 1 is viewed from the +Z side to the −Z side along the Z direction. FIG. 7 is a VII-VII cross-sectional view illustrating the example of the method for fixing the power receiving module 11 illustrated in FIG. 6. FIG. 8 is a VIII-VIII cross-sectional view illustrating the example of the method for fixing the power receiving module 11 illustrated in FIG. 6.

As illustrated in FIGS. 6 to 8, the power receiving module 11 is fixed to an inner surface 102a corresponding to the surface 102 of the housing 100 by adhesive members 201 and 202.

Specifically, as the adhesive member 201, a double-sided tape that enables adhesion between both sides of a base material on a thin film can be used. In other words, the adhesive member 201 includes a double-sided tape. An adhesive surface of the adhesive member 201 on the +Z side adheres to the power receiving coil 110, an adhesive surface of the adhesive member 201 on the −Z side adheres to the surface 102 of the housing 100, specifically, the inner surface 102a corresponding to the surface 102. That is, in the mobile printer 1 of the present embodiment, the surface 102 of the housing 100 and the inner surface 102a corresponding to the surface 102 functions as a power supply surface that implements the non-contact power supply between the power transmission unit 4 and the power supply unit 10. The power receiving coil 110 is fixed to the inner surface 102a of the surface 102 corresponding to the power supply surface of the mobile printer 1 by the adhesive member 201, such that a distance between the power receiving coil 110 of the power supply unit 10 and the power transmission unit 4 can be shortened. As a result, the power receiving efficiency in the power supply unit 10 is improved.

Furthermore, the mobile printer 1 of the present embodiment has the cutting unit 50 cutting the recording paper P, and the cutting unit 50 is accommodated in the accommodation space of the housing 100. Therefore, paper dust generated when the recording paper P is cut, or iron powder generated when the cutting unit 50 cuts the recording paper P due to abrasion of the fixing blade 54 and the movable blade 56 enters into the accommodation space of the housing 100, and accumulated inside the accommodation space. When such paper dust and iron powder enter between the power receiving coil 110 and the inner surface 102a of the surface 102, the magnetic field Pmg for receiving power by the power receiving coil 110 is disturbed. As a result, the power receiving efficiency in the power supply unit 10 may be reduced.

In response to such a problem, in the mobile printer 1 of the present embodiment, the power receiving coil 110 adheres to the inner surface 102a corresponding to the surface 102 by the adhesive member 201, adhesion between the power receiving coil 110 and the inner surface 102a is thus improved. As a result, the possibility that paper dust and iron powder enter between the power receiving coil 110 and the inner surface 102a of the surface 102 is reduced, and the possibility of reduction in the power receiving efficiency of the power supply unit 10 is reduced.

Particularly, the mobile printer 1 as described in the present embodiment requires reduction in size of the housing 100 from the viewpoint of not impairing the portability. When the mobile printer 1 is provided with a partition for reducing the possibility that the paper dust or the iron powder enters between the power receiving coil 110 and the inner surface 102a of the surface 102, the mobile printer 1 is difficult to reduce the size. On the other hand, in the mobile printer 1 of the present embodiment, the power receiving coil 110 adheres to the inner surface 102a corresponding to the surface 102 by the adhesive member 201, such that the possibility that the paper dust and the iron powder enter between the power receiving coil 110 and the inner surface 102a of the surface 102 can be reduced, while reducing the possibility of increasing in size of the mobile printer 1. That is, in the mobile printer 1 as described in the present embodiment, while reducing the possibility of impairing portability, the possibility that the paper dust and the iron powder enter between the power receiving coil 110 and the inner surface 102a of the surface 102 can be reduced, and the possibility of reduction in the power receiving efficiency of the power supply unit 10 can be reduced.

When the mobile printer 1 is viewed along the Z direction, at least a part of such an adhesive member 201 is preferably located between the coil inner region 113 of the power receiving coil 110 and the inner surface 102a corresponding to the surface 102, and at least a part of the adhesive member 201 is preferably located between a region from the coil inner region 113 of the power receiving coil 110 to the coil outer region 115 and the inner surface 102a corresponding to the surface 102. Further, as illustrated in FIGS. 6 to 8, when the mobile printer 1 is viewed along the Z direction, at least a part of the adhesive member 201 is more preferably located between the almost entire region of the mold member 112 on one surface located on the −Z side and the inner surface 102a corresponding to the surface 102, the mold member 112 being provided so as to cover the annular coil 111 of the power receiving coil 110.

A magnetic flux based on the magnetic field Pmg received by the power receiving coil 110 passes through inside the annular coil 111, that is, in the coil inner region 113 at a higher density. In the coil inner region 113 through which the magnetic flux passes at such a high density, at least a part of the adhesive member 201 is located between the power receiving coil 110 and the inner surface 102a corresponding to the surface 102, and the power receiving coil 110 is fixed to the inner surface 102a corresponding to the surface 102, thereby further reducing the possibility that the paper dust and the iron powder contribute to the magnetic field Pmg received by the power receiving coil 110. As a result, the possibility that the power receiving efficiency of the power supply unit 10 is reduced due to the contribution to the paper dust and the iron powder, is further reduced.

In this case, the adhesive member 201 is located between the power receiving coil 110, the region from the coil inner region 113 to the coil outer region 115, and the inner surface 102a corresponding to the surface 102, thereby further reducing the possibility of entering the paper dust and the iron powder into the coil inner region 113, and further reducing the possibility that the paper dust and the iron powder contributes to the magnetic field Pmg generated around the power receiving coil 110. As a result, the possibility of reduction in the power receiving efficiency of the power supply unit 10 is further reduced.

Furthermore, the adhesive member 201 is located between the almost entire region on one surface of the mold member 112 located on the −Z side and the inner surface 102a corresponding to the surface 102, the mold member 112 provided so as to cover the annular coil 111 of the power receiving coil 110, thereby further reducing the possibility of entering the paper dust and the iron powder into the coil inner region 113, and further reducing the possibility that the paper dust and the iron powder contributes to the magnetic field Pmg generated around the power receiving coil 110. As a result, the possibility of reduction in the power receiving efficiency of the power supply unit 10 is further reduced. Here, "the almost entire surface on one surface of the mold member 112 located on the −Z side" means that, for example, the adhesive member 201 is located between a region of 80% or more of the mold member 112 of the power receiving coil 110 and the inner surface 102a corresponding to the surface 102 when the power receiving coil 110 is located along the Z direction.

As the adhesive member 202, a double-sided tape that enables adhesion between both sides of a base material on a thin film can be used. In other words, the adhesive member 202 includes a double-sided tape. An adhesive surface of the adhesive member 202 on the +Z side adheres to the power receiving circuit 120, an adhesive surface of the adhesive member 202 on the −Z side adheres to the surface 102 of the housing 100, specifically, the inner surface 102a corresponding to the surface 102.

That is, the power receiving circuit 120 and the power receiving coil 110 are located on the same surface of the housing 100, and are attached to the inner surface 102a of the surface 102 by the adhesive member 202. As described above, the power receiving coil 110 and the power receiving circuit 120 are electrically coupled by the end portions TM1 and TM2. Therefore, when an impact or the like is applied to the mobile printer 1, electrical coupling failure may occur between the power receiving coil 110 and the power receiving circuit 120. In response to such a problem, the power receiving circuit 120 and the power receiving coil 110 can be attached to the same surface of the housing 100 to shorten an electrical distance between the power receiving coil 110 and the power receiving circuit 120, and even when the impact or the like is applied to the mobile printer 1, the possibility that unintended stress is applied to the end portion TM1 and the end portion TM2 for electrically coupling the power receiving circuit 120 and the power receiving coil 110 is reduced. As a result, the possibility that the electrical coupling failure occurs between the power receiving circuit 120 and the power receiving coil 110 is reduced, and the possibility that the noise is superimposed on the power reception signal Vpr input to the power receiving circuit 120 is reduced, thus improving an accuracy of the DC voltage signal Vdc2 output by the power receiving module 11.

Here, the adhesive members 201 and 202 in the present embodiment have been described as being a double-sided tape, but the adhesive members 201 and 202 are not limited to the double-sided tape, and the power receiving module 11 may be fixed to the inner surface 102a. Therefore, as the adhesive members 201 and 202, a liquid adhesive substance can be used instead of the double-sided tape, such as a vinyl acetate resin solvent, a vinyl copolymer resin solvent, an adhesive substance using rubber solvent, or an adhesive substance that causes a chemical reaction by adding energy such as light or heat or a reactant to a liquid that mainly contains components before the chemical reaction. However, when the liquid adhesive substance is used, a relative positional relationship between the inner surface 102a corresponding to the surface 102 and the power receiving module 11 varies depending on the coating state of the liquid adhesive substance. As a result, the power receiving efficiency may vary, and an unintended gap may occur between the inner surface 102a and the power receiving module 11 due to the coating state, resulting in entering the paper dust and the iron powder between the inner surface 102a and the power receiving module 11. On the other hand, when a double-sided tape is used as the adhesive members 201 and 202, the possibility that the relative positional relationship between the inner surface 102a and the power receiving module 11 varies is reduced, and the possibility that the unintended gap occurs between the inner surface 102a and the power receiving module 11 is reduced.

In the mobile printer 1 of the present embodiment, the power receiving module 11 is fixed to the inner surface 102a of the surface 102, which is one of an outer shells of the housing 100, from the viewpoint of enhancing the power receiving efficiency in the non-contact power supply. In such a mobile printer 1, in order to further enhance the power receiving efficiency, it is considered to shorten the distance between the power receiving coil 110 of the power supply unit 10 and the power transmission unit 4. That is, in the mobile printer 1, the distance between the power receiving coil 110 of the power supply unit 10 and the power transmission unit 4 is preferably shortened from the viewpoint of enhancing the power receiving efficiency in the non-contact power supply. Therefore, a thickness t1 of the surface 102 of the housing 100, to which the power receiving module 11 as illustrated in FIG. 8 is attached, along the Z direction is preferably as small as possible.

On the other hand, when the thickness t1 of the surface 102 of the housing 100, to which the power receiving module 11 is attached, along the Z direction is small, a strength of the mobile printer 1 may decrease. Particularly, it is required for the mobile printer 1 as described in the present embodiment to have a strength even when the impact caused by dropping is applied to the mobile printer 1, because the user can image a scene that he or she carries or uses the mobile printer 1.

In response to such a problem, the mobile printer 1 of the present embodiment has a characteristic configuration in which at least a part of the partition wall portion 61c, which constitutes at least one surface of the roll body accommodating portion 60, is located between the power receiving module 11 and the roll body accommodating portion 60 in the direction along the Z direction, which is a direction from the power receiving module 11 to the roll body accommodating portion 60, and a thickness t2 of the partition wall portion 61c along the Z direction as one direction is larger than the thickness t1 of the surface 102 along the Z direction as one direction.

As a result, even when the thickness t1 of the surface 102 of the housing 100 to which the power receiving module 11 is attached along the Z direction is as small as possible, the strength of the housing 100 can be supplemented by the partition wall portion 61c. That is, the mobile printer 1 in the present embodiment can have the enhanced power receiving efficiency in the power receiving module 11, and have a high strength against the impact such as dropping of the mobile printer 1 by the partition wall portion 61c located between the power receiving module 11 and the roll body accommodating portion 60. In other words, it is possible to implement both the improvement in power receiving efficiency in non-contact power supply and the strength against the impact such as dropping.

In the mobile printer 1 configured as described above, the housing 100 and the partition wall portion 61 including the partition wall portion 61c are resin forming members, and preferably include a plastic material. As described above, in the mobile printer 1 of the present embodiment, it is possible to implement both the improvement in power receiving efficiency in non-contact power supply and the strength against the impact such as dropping. Therefore, even when the housing 100 and the partition wall portion 61 including the partition wall portion 61c are resin forming members and include a plastic material, the mobile printer 1 having sufficient strength can be implemented. As a result, the mobile printer 1 including the housing 100 and the partition wall portion 61 including the partition wall portion 61c can be reduced in weight, and the portability of the mobile printer 1 can be further improved.

Here, inside or the entire of the housing 100 and the partition wall portion 61 including the partition wall portion 61c may be filled with a plastic material, or the housing 100 and the partition wall portion 61 including the partition wall portion 61c may have a cavity therein. Accordingly, the mobile printer 1 can be reduced in weight, and as a result, the portability of the mobile printer 1 can be further improved.

As illustrated in FIGS. 6 to 8, the mobile printer 1 includes a static electricity removal film 220 of which at least a part is located between the roll body accommodating portion 60 and the power receiving module 11 and adjacent to the power receiving module 11.

When the transport unit 40 pulls out the recording paper P from the roll body R, the mobile printer 1 having the roll body R on which the recording paper P as described in the present embodiment is wound comes into contact with the recording paper P wound around the roll body R, electric charges are stored in the recording paper P and the roll body accommodating portion 60, and the electric charges are discharged as static electricity. When such static electricity contributes to the power receiving module 11, a malfunction occurs in the power receiving module 11, and an accuracy of the DC voltage signal Vdc2 output by the power receiving module 11 deteriorates. As a result, the malfunction may occur in the mobile printer 1 driven based on the DC voltage signal Vdc2, and a printing quality of the mobile printer 1 may deteriorate.

In response to such a problem, in the mobile printer 1 of the present embodiment, at least a part of the static electricity removal film 220 is located between the roll body accommodating portion 60 and the power receiving module 11 and is located adjacent to the power receiving module 11, and thus the possibility that the static electricity generated by transport of the recording paper P contributes to the power receiving module 11 is reduced. As a result, an operational stability of the mobile printer 1 is improved.

At least a part of such a static electricity removal film 220 is preferably located between the roll body accommodating portion 60 and the power receiving coil 110 of the power receiving module 11, and further, at least a part of the static electricity removal film 220 is more preferably located in the direction along the Z direction so as to overlap with the entire of the power receiving coil 110 of the power receiving module 11.

The power receiving module 11 outputs the power reception signal Vpr, which is the basis of the DC voltage signal Vdc2, by receiving the magnetic field Pmg by the power receiving coil 110. Therefore, when the accuracy of the power reception signal Vpr output by the power receiving coil 110 deteriorates due to the contribution of the static electricity to the power receiving coil 110, the accuracy of the DC voltage signal Vdc2 output by the power receiving module 11 significantly deteriorates. The static electricity removal film 220 can be located so as to at least overlap with the power receiving coil 110, thereby efficiently protecting the power receiving coil 110 from the static electricity. As a result, the possibility that the accuracy of the DC voltage signal Vdc2 output by the power receiving module 11 deteriorates is reduced.

Furthermore, at least a part of the static electricity removal film 220 is also located between the roll body accommodating portion 60 and the power receiving circuit 120, thereby further reducing the possibility that the static electricity generated by transport of the recording paper P contributes to the power receiving module 11. As a result, the possibility that the accuracy of the DC voltage signal Vdc2 output by the power receiving module 11 deteriorates is further reduced.

Particularly, in the mobile printer 1 in which the roll body R is accommodated in the roll body accommodating portion 60 by a drop-in method as described in the present embodiment, when the recording paper P wound around the roll body R is pulled out by the transport unit 40, the recording paper P also comes into contact with the partition wall portion 61. Therefore, the more static electricity is generated in the mobile printer 1 in which the roll body R is accommodated in the roll body accommodating portion 60 by a drop-in method. However, in the mobile printer 1 of the present embodiment, at least a part of the static electricity removal film 220 is located between the roll body accommodating portion 60 and the power receiving module 11 and adjacent to the power receiving module 11, and thus even in the mobile printer 1 that employs the drop-in method, the possibility that the static electricity generated by the transport of the recording paper P contributes to the power receiving module 11 is reduced. As a result, the possibility that the accuracy of the DC voltage signal Vdc2 output by the power receiving module 11 deteriorates is reduced, and the possibility that the operational stability of the mobile printer 1 deteriorates is reduced.

An arrangement of the static electricity removal film 220 disposed in the accommodation space of the housing 100 as described above is defined by protruding portions 211 to 214 provided on the housing 100.

Specifically, the housing 100 includes the protruding portions 211 to 214 formed on the inner surface 102a corresponding to the surface 102. The protruding portion 211 is located on the +Y side of the power receiving module 11, the protruding portion 212 is located on the −Y side of the power receiving module 11, the protruding portion 213 is located on the +X side of the power receiving module 11, and the protruding portion 214 is located on the −X side of the power receiving module 11. That is, the protruding portion 211 and the protruding portion 212 are located facing each other along the Y direction via the power receiving module 11, and the protruding portion 213 and the protruding portion 214 are located facing each other along the Y direction via the power receiving module 11. The protruding portions 211 to 214 are located on four sides of the power receiving module 11.

The static electricity removal film 220 is accommodated in the accommodation space of the housing 100 so that a short side on the +X side comes into contact with the protruding portion 213, a short side on the −X side comes into contact with the protruding portion 214, a short side on the +Y side comes into contact with the protruding portion 211, and a short side on the −Y side comes into contact with the protruding portion 212.

Accordingly, the static electricity removal film 220 is adjacent to the power receiving module 11 and is disposed at a predetermined position defined based on the power receiving module 11. As a result, the static electricity removal film 220 can reduce the possibility that the static electricity generated in the roll body accommodating portion 60 contributes to the power receiving module 11. The protruding portions 211 to 214 may be provided so that the static electricity removal film 220 can be disposed at a predetermined position, for example, some of the protruding portions 211 to 214 may be formed on the partition wall portion 61. That is, the number and the arrangement of the protruding portions of the housing 100 are not limited to the number and the arrangement illustrated in FIGS. 6 to 8.

In the mobile printer 1 in which the thermal paper is used as the recording paper P as illustrated in the present embodiment, heat generated in the power receiving module 11 contributes to the roll body R, and as a result, the recording paper P may be decolored. In response to such a problem, in the mobile printer 1 of the present embodiment, the static electricity removal film 220 is located between the power receiving module 11 and the roll body accommodating portion 60, so that the static electricity removal film 220 functions as a heat insulating material. As a result, the possibility that the heat generated in the power receiving module 11 contributes to the roll body R accommodated in the roll body accommodating portion 60 is reduced.

As described above, the mobile printer 1 is also required to be portable because of its use. The static electricity removal film 220 located between the power receiving module 11 and the roll body accommodating portion 60 has heat insulation. Thus, the possibility that the static electricity generated in the roll body accommodating portion 60 contributes to the power receiving module 11 can be reduced, and the possibility that the heat generated in the power receiving module 11 contributes to the roll body R accommodated in the roll body accommodating portion 60 can be reduced, without increasing the size of the mobile printer 1. As a result, the operational stability of the mobile printer 1 is improved, the possibility of decolorization of the recording paper P is reduced, and the reliability of the mobile printer 1 is further improved.

4. Transmission of Voltage Signal Through Inside of Housing 100

Figure 9:
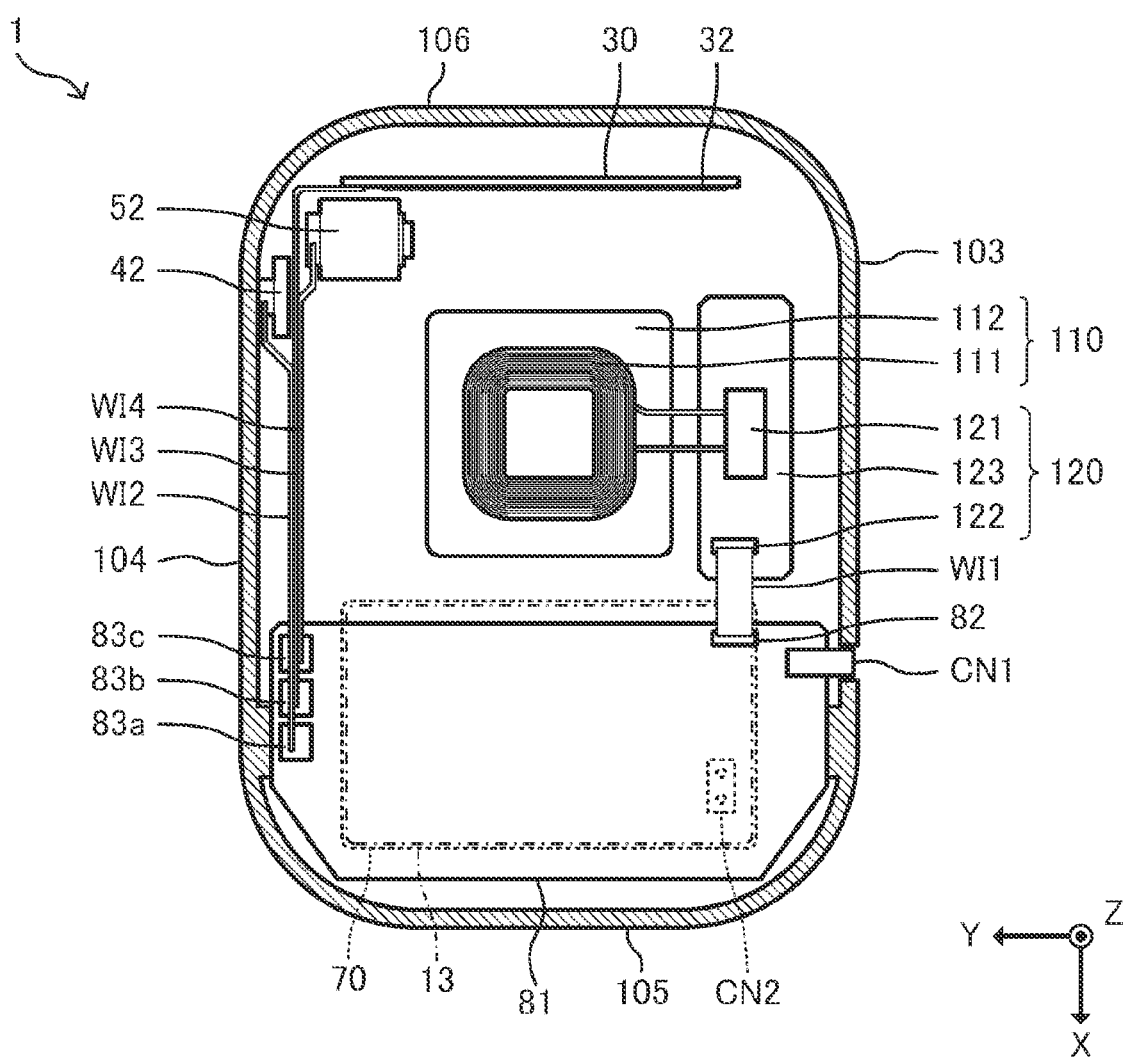
FIG. 9 is a diagram for explaining a flow of an electric signal inside the mobile printer.

Next, a relationship between an arrangement of various configurations in the mobile printer 1 and a flow of an electric signal will be described. FIG. 9 is a diagram for explaining a flow of an electric signal inside the mobile printer 1.

As illustrated in FIG. 9, the power receiving module 11 is located so that at least a part of the power receiving coil 110 overlaps with a center portion of the surface 103 and the surface 104 in the direction along the Z direction of the mobile printer 1, and the power receiving circuit 120 is provided in the accommodation space of the housing 100 so that the connector 122 is located on a side of the surface 105 on a side of the surface 103 of the power receiving coil 110. Moreover, one end of wiring WI1 is attached to the connector 122. The other end of the wiring WI1 is attached to the connector 82 of the wiring substrate 80. As a result, the DC voltage signal Vdc2 output by the power receiving module 11 is input to the wiring substrate 80.

The wiring substrate 80 is located on the side of the surface 105 of the power receiving module 11. On the side of the surface 103 of the wiring substrate 80, at least one of the connector CN1 is located so as to be exposed to the outside of the housing 100 through an opening portion provided on the surface 103 of the housing 100. That is, the connector CN1 is provided so that the cable can be attached and detached by the user. The DC voltage signal Vdc1 is input to the wiring substrate 80 of the mobile printer 1 via the connector CN1 and the cable coupled to the connector CN1.

Further, the connector CN2 is provided on the surface of the wiring substrate 80 on the –Z side. The connector CN2 is located on the side of the surface 103 of the battery accommodating portion 70 to which the battery module 13 is attached. That is, the connector CN2 is located on the side of the surface 103 of the wiring substrate 80. The DC voltage signal Vdc1 input to the wiring substrate 80 via the connector CN1 and the DC voltage signal Vdc2 input to the wiring substrate 80 via the connector 82 are transmitted to the connector CN2, and supplied to the battery module 13 attached to the battery accommodating portion 70, via the power supply switching circuit 12 (not illustrated in FIG. 9) provided on the wiring substrate 80. As a result, the electric charges are stored in the battery module 13. Then, the battery module 13 generates the DC voltage signal Vbat according to an amount of electric charges held, and inputs the DC voltage signal Vbat to the wiring substrate 80 via the connector CN2.

That is, the DC voltage signals Vdc1 and Vdc2 as the drive power of the mobile printer 1 and the DC voltage signal Vbat generated based on the DC voltage signals Vdc1 and Vdc2 are all on the side of the surface 103 of the wiring substrate 80, and input from the side of the surface 103 of the mobile printer 1 to the wiring substrate 80 having the control unit 20.

In other words, the power receiving module 11 is disposed in the accommodation space of the housing 100 so that a shortest distance between the power receiving circuit 120 and the surface 103 is shorter than a shortest distance between the power receiving circuit 120 and the surface 104, the connector CN1 is disposed in the accommodation space of the housing 100 so that a shortest distance between the connector CN1 and the surface 103 is shorter than a shortest distance between the connector CN1 and the surface 104, and the connector CN2 is disposed in the accommodation space of the housing 100 so that a shortest distance between the connector CN2 and the surface 103 is shorter than a shortest distance between the connector CN2 and the surface 104.

The power supply circuit 14 (not illustrated in FIG. 9) provided in the wiring substrate 80 generates the drive voltage signal Vd from the DC voltage signal Vbat that is generated based on the DC voltage signals Vdc1 and Vdc2 input via the connector CN2, and outputs the drive voltage signal Vd to the control unit 20 (not illustrated in FIG. 9) provided in the wiring substrate 80.

The control unit 20 generates and outputs the medium transport signal Str based on the drive voltage signal Vd. The medium transport signal Str output by the control unit 20 is transmitted through wiring WI2 that is attached to a connector 83a provided on a side of the surface 104 of the wiring substrate 80, and is supplied to the transport motor 42 provided on the side of the surface 104 of the accommodation space of the housing 100. In this case, the wiring WI2 is disposed along the surface 104. That is, the mobile printer 1 includes the wiring WI2 that electrically couples the control unit 20 and the transport unit 40, and the wiring WI2 is accommodated in the accommodation space of the housing 100 so that a shortest distance between the wiring WI2 and the surface 103 is longer than a shortest distance between the wiring WI2 and the surface 104.

The control unit 20 generates and outputs the head drive signal Sdr based on the drive voltage signal Vd. The head drive signal Sdr output by the control unit 20 is transmitted through wiring WI3 that is attached to a connector 83b provided on the side of the surface 104 of the wiring substrate 80, and is supplied from the end portion on the side of the surface 104 of the print head 30 provided on the side of the surface 106 to the print head 30 in the accommodation space of the housing 100. In this case, the wiring WI3 is disposed along the surface 104. That is, the mobile printer 1 includes the wiring WI3 that electrically couples the control unit 20 and the print head 30, and the wiring WI3 is accommodated in the accommodation space of the housing 100 so that a shortest distance between the wiring WI3 and the surface 103 is longer than a shortest distance between the wiring WI3 and the surface 104.

The control unit 20 generates and outputs the medium cutting signal Sct based on the drive voltage signal Vd. The medium cutting signal Sct output by the control unit 20 is transmitted through wiring WI4 that is attached to a connector 83c provided on a side of the surface 104 of the wiring substrate 80, and is supplied to the cutting motor 52 provided on the side of the surface 104 in the accommodation space of the housing 100. In this case, the wiring WI4 is disposed along the surface 104. That is, the mobile printer 1 includes the wiring WI4 that electrically couples the control unit 20 and the cutting unit 50, and the wiring WI4 is accommodated in the accommodation space of the housing 100 so that a shortest distance between the wiring WI4 and the surface 103 is longer than a shortest distance between the wiring WI4 and the surface 104.

In the mobile printer 1 of the present embodiment as described above, the DC voltage signals Vdc1, Vdc2, and Vbat, which are the basis of the drive voltage signal Vd supplied to the control unit 20, are all supplied from the side of the surface 103 of the wiring substrate 80 to the wiring substrate 80. The control unit 20 provided in the wiring substrate 80 generates the medium transport signal Str, the head drive signal Sdr, and the medium cutting signal Sct for performing the printing process of the mobile printer 1, based on the drive voltage signal Vd. The medium transport signal Str, the head drive signal Sdr, and the medium cutting signal Sct output by the control unit 20 are all transmitted through the wirings WI2, WI3, and WI4 located on the surface 104 side of the housing 100, and are supplied to the transport unit 40, print head 30, and the cutting unit 50.

Accordingly, in the mobile printer 1, the possibility that signals supplied to the control unit 20 and signals output by the control unit 20 interfere with each other is reduced. As a result, the operational stability of the mobile printer 1 is improved. Therefore, even in the mobile printer 1 with a demand for reduction in size from the viewpoint of portability, the possibility that the signals supplied to the control unit 20 and the signals output by the control unit 20 interfere with each other is reduced. As a result, even when the mobile printer 1 is reduced in size, the possibility that the malfunction occurs in the mobile printer 1 is reduced, and the operational stability of the mobile printer 1 is improved.

Here, the surface 102 and the inner surface 102a corresponding to the surface 102 provided in the housing 100 is an example of the power supply surface, the surface 102 constituting the battery accommodating portion 70 of the surface 102 of the housing 100 is an example of a partition wall, the fixing blade 54 of the cutting unit 50 is an example of a first blade, and the movable blade 56 of the cutting unit 50 is an example of the second blade.

5. Operational Effect

As described above, in the mobile printer 1 of the present embodiment, the power receiving module 11 is fixed to the inner surface 102a corresponding to the surface 102 of the housing 100 by the adhesive members 201 and 202, and thus the distance between the power receiving coil 110 of the power supply unit 10 and the power transmission unit 4 can be shortened. As a result, the power receiving efficiency in the power supply unit 10 can be improved.

Moreover, in the mobile printer 1 of the present embodiment, the power receiving coil 110 adheres to the inner surface 102a corresponding to the surface 102 by the adhesive member 201, such that the possibility that the paper dust generated due to cutting of the recording paper P or the iron powder generated due to the abrasion of the fixing blade 54 and the movable blade 56 enters between the power receiving coil 110 and the inner surface 102a of the surface 102, is reduced, while reducing the possibility of increasing in size of the mobile printer 1. As a result, the possibility of reduction of the power receiving efficiency in the power supply unit 10 is reduced due to the paper dust and the iron powder entering between the power receiving coil 110 and the inner surface 102a of the surface 102.

In the mobile printer 1 of the present embodiment has a characteristic configuration in which at least a part of the partition wall portion 61c, which constitutes at least one surface of the roll body accommodating portion 60, is located between the power receiving module 11 and the roll body accommodating portion 60 in the direction along the Z direction, which is a direction from the power receiving module 11 to the roll body accommodating portion 60, and a thickness t2 of the partition wall portion 61c along the Z direction as one direction is larger than the thickness t1 of the surface 102 along the Z direction as one direction. Therefore, even when the thickness t1 along the Z direction of the surface 102 of the housing 100 to which the power receiving module 11 is attached is as small as possible, the strength of the housing 100 is supplemented by the partition wall portion 61c. As a result, it is possible to improve the power receiving efficiency in the non-contact power supply for supplying the drive power to the mobile printer 1 and secure sufficient strength for the mobile printer 1.

The mobile printer 1 of the present embodiment includes the static electricity removal film 220 of which at least a part is located between the roll body accommodating portion 60 and the power receiving module 11 and is located adjacent to the power receiving module 11, and thus even in the mobile printer 1 having the roll body R on which the recording paper P is wound, the possibility that the static electricity generated by transport of the recording paper P contributes to the power receiving module 11 is reduced. As a result, the operational stability of the mobile printer 1 is improved.

Further, in the mobile printer 1 of the present embodiment, the power receiving circuit 120 of the power receiving module 11 which receives the drive power by the non-contact power supply from the outside of the mobile printer 1 is disposed in the accommodation space of the housing 100 so that the shortest distance between the power receiving circuit 120 and the surface 103 is shorter than the shortest distance between the power receiving circuit 120 and the surface 104, the connector CN1 which receives the drive power by the non-contact power supply from the outside of the mobile printer 1 is disposed in the accommodation space of the housing 100 so that the shortest distance between the connector CN1 and the surface 103 is shorter than the shortest distance between the connector CN1 and the surface 104, and the connector CN2 through which the DC voltage signal Vbat output by the battery module 13 is transmitted is disposed in the accommodation space of the housing 100 so that the shortest distance between the connector CN2 and the surface 103 is shorter than the shortest distance between the connector CN2 and the surface 104. In the mobile printer 1 of the present embodiment, the wiring WI2 which electrically couples the control unit 20 and the transport unit 40 and through which the medium transport signal Str supplied to the transport unit 40 is transmitted is accommodated in the accommodation space of the housing 100, so that the shortest distance between the wiring WI2 and the surface 103 is longer than the shortest distance between the wiring WI2 and the surface 104.

That is, in the mobile printer 1 of the present embodiment, inside the housing 100, the signals supplied to the control unit 20 and the signals output by the control unit 20 are transmitted through the vicinity of surfaces facing each other in the housing 100. Accordingly, the possibility that signals supplied to the control unit 20 and signals output by the control unit 20 interfere with each other is reduced. As a result, the operational stability of the mobile printer 1 is improved.

The embodiment has been described above, but the present disclosure is not limited to the embodiments and the modification examples, and can be implemented in various aspects without departing from the gist thereof. For example, the above-described embodiment can be combined as appropriate.

The present disclosure includes substantially the same configurations (for example, configurations having the same functions, methods, and results, or configurations having the same objects and effects) as the configurations described in the embodiment. Further, the present disclosure includes configurations in which non-essential parts of the configuration described in the embodiment are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiment.

The following contents are derived from the above-described embodiment.

One aspect of a mobile printer includes: a roll body accommodating portion accommodating a roll body on which recording paper is wound; a print head performing printing on the recording paper; a transport unit pulling out the recording paper from the roll body and transporting the recording paper to the print head; a cutting unit cutting the recording paper; a power supply unit supplying a drive voltage signal to the print head, the transport unit, and the cutting unit; and a housing covering the roll body accommodating portion, the print head, the transport unit, the cutting unit, and the power supply unit, in which the power supply unit has a power receiving module receiving a signal based on a power supply voltage signal from an outside by a non-contact power supply, and the power receiving module is fixed to a power supply surface of the housing by an adhesive member.

According to the mobile printer, the power supply unit supplying the drive voltage signal to the print head, the transport unit, and the cutting unit is provided, and the power receiving module receiving the signal based on the power supply voltage signal from the outside by the non-contact power supply is fixed to the power supply surface of the housing by the adhesive member. That is, the power receiving module is disposed in the vicinity of the power supply surface. As a result, the power receiving efficiency is improved by the non-contact power supply performed by the power receiving module.

Further, the power receiving module receiving the signal based on the power supply voltage signal from the outside by the non-contact power supply is fixed to the power supply surface of the housing by the adhesive member. Thus, the possibility that the paper dust of the recording paper generated in the cutting unit that cuts the recording paper or the iron powder generated due to abrasion of the cutting unit enters between the power receiving module and the power supply surface, is reduced. As a result, the possibility of the distortion on the signals that the power receiving module receives by the non-contact power supply occurs is reduced, and the accuracy of the signal that the power receiving module receives by the non-contact power supply is thus improved, and the power receiving efficiency is improved by the non-contact power supply performed by the power receiving module.

In one aspect of the mobile printer, the adhesive member may include a double-sided tape.

According to the mobile printer, the double-sided tape is used as the adhesive member for fixing the power receiving module to the power supply surface. Therefore, the relative positional relationship between the power receiving module and the power supply surface is stabilized, and the power receiving efficiency is improved by the non-contact power supply performed by the power receiving module, such that the possibility that the paper dust and the iron powder enter between the power receiving module and the power supply surface is further reduced, and the possibility of the distortion on the signals that the power receiving module receives by the non-contact power supply occurs is further reduced.

In one aspect of the mobile printer, the cutting unit may have a first blade made of metal, the recording paper may be pressed against the first blade so that the cutting unit may cut the recording paper.

According to the mobile printer, even when the cutting unit cutting the recording paper by pressing the recording paper against the first blade made of metal is provided, the possibility that the paper dust of the recording head generated in the cutting unit that cuts the recording paper or the iron powder generated due to the abrasion of the cutting unit enters between the power receiving module and the power supply surface is reduced. Therefore, the possibility of the distortion on the signals that the power receiving module receives by the non-contact power supply is reduced, the accuracy of the signal that the power receiving module receives by the non-contact power supply is improved, and the power receiving efficiency is improved by the non-contact power supply performed by the power receiving module.

In one aspect of the mobile printer, the cutting unit may have a second blade made of metal, and the second blade presses the recording paper against the first blade so that the cutting unit may cut the recording paper.

According to the mobile printer, even when the cutting unit cutting the recording paper by pressing the recording paper against the first blade by the second blade made of metal is provided, the possibility that the paper dust of the recording paper generated in the cutting unit that cuts the recording paper or the iron powder generated due to the abrasion of the cutting unit enters between the power receiving module and the power supply surface is reduced. Therefore, the possibility of the distortion on the signals that the power receiving module receives by the non-contact power supply is reduced, the accuracy of the signal that the power receiving module receives by the non-contact power supply is improved, and the power receiving efficiency is improved by the non-contact power supply performed by the power receiving module.

In one aspect of the mobile printer, the first blade may have a sawtooth shape.

According to the mobile printer, even when the first blade has a sawtooth shape which tends to generate the paper dust, the possibility that the paper dust of the recording paper generated in the cutting unit that cuts the recording paper or the iron powder generated due to the abrasion of the cutting unit enters between the power receiving module and the power supply surface is reduced. Therefore, the possibility of the distortion on the signals that the power receiving module receives by the non-contact power supply is reduced, the accuracy of the signal that the power receiving module receives by the non-contact power supply is improved, and the power receiving efficiency is improved by the non-contact power supply performed by the power receiving module.

In one aspect of the mobile printer, the power receiving module may have a power receiving coil receiving a power transmission signal based on the power supply voltage signal as a power reception signal, the power receiving coil may include a coil region where an annular coil through which the power reception signal is transmitted is located and a coil inner region located inside the coil region, and at least a part of the adhesive member may be located between the coil inner region and the power supply surface.

According to the mobile printer, when the power receiving module performs the non-contact power supply, the adhesive member is located between the coil inner region through which more magnetic flux can pass and the power supply surface. Thus, the possibility of the distortion of the signals that the power receiving module receives by the non-contact power supply occurs is further reduced, the accuracy of the signal that the power receiving module receives by the non-contact power supply is further improved, and the power receiving efficiency is further improved by the non-contact power supply performed by the power receiving module.

In one aspect of the mobile printer, the power receiving coil may include a coil outer region located outside the coil region, and at least a part of the adhesive member may be located between the coil outer region and the power supply surface.

According to the mobile printer, when the power receiving module performs the non-contact power supply, the adhesive member is located between the coil inner region through which more magnetic flux can pass and the power supply surface, and the adhesive member extends to the coil outer region. Thus, the possibility of the distortion of the signals that the power receiving module receives by the non-contact power supply occurs is further reduced, the accuracy of the signal that the power receiving module receives by the non-contact power supply is further improved, and the power receiving efficiency is further improved by the non-contact power supply performed by the power receiving module.

In one aspect of the mobile printer, the power receiving coil may have a mold member provided so as to cover the annular coil, and the adhesive member may be located between the almost entire region on one surface of the mold member and the power supply surface.

According to the mobile printer, when the power receiving module performs the non-contact power supply, the adhesive member is located between the almost entire region on the one surface of the mold member and the power supply surface including between the coil inner region through which more magnetic flux can pass and the power supply surface, and the adhesive member extends to the coil outer region. Thus, the possibility of the distortion of the signals that the power receiving module receives by the non-contact power supply occurs is further reduced, the accuracy of the signal that the power receiving module receives by the non-contact power supply is further improved, and the power receiving efficiency is further improved by the non-contact power supply performed by the power receiving module.

In one aspect of the mobile printer, the power receiving coil may be located in a direction along a direction from the power supply surface to the power receiving module so as not to overlap with an electronic component.

According to the mobile printer, when the power receiving module performs the non-contact power supply, the possibility that the more magnetic flux interferes with the electronic component is reduced, and the accuracy of the signal that the power receiving module receives by the non-contact power supply is further improved.

In one aspect of the mobile printer, the power supply unit may have a battery module, and a partition wall may be located between the battery module and the power receiving module.

One aspect of the mobile printer may further include a control unit controlling an operation of at least one of the print head, the transport unit, and the cutting unit, in which the control unit may be located in a direction along a direction from the power supply surface to the power receiving module so as not to overlap with the power receiving module.

According to the mobile printer, when the power receiving module performs the non-contact power supply, the possibility that the more magnetic flux interferes with the control unit is reduced, and the accuracy of the signal that the power receiving module receives by the non-contact power supply is further improved.

What is claimed is:

1. A mobile printer comprising:
   a roll body accommodating portion accommodating a roll body on which recording paper is wound;
   a print head performing printing on the recording paper;
   a transport unit pulling out the recording paper from the roll body and transporting the recording paper to the print head;
   a cutting unit cutting the recording paper;
   a power supply unit supplying a drive voltage signal to the print head, the transport unit, and the cutting unit; and
   a housing covering the roll body accommodating portion, the print head, the transport unit, the cutting unit, and the power supply unit, wherein
   the power supply unit has a power receiving module receiving a signal based on a power supply voltage signal from an outside by a non-contact power supply,
   the power receiving module includes
      a power receiving coil that receives a power transmission signal based on the power supply voltage signal as a power reception signal, and
      a power receiving circuit that converts the power reception signal received by the power receiving coil into a direct current voltage signal to output the power reception signal, and
   the power receiving coil is fixed to a power supply surface of the housing by an adhesive member, and the power receiving circuit is fixed to the power supply surface of the housing by a separate adhesive member that is separate from the adhesive member.

2. The mobile printer according to claim 1, wherein the adhesive member includes a double-sided tape.

3. The mobile printer according to claim 1, wherein the cutting unit has a first blade made of metal, and the recording paper is pressed against the first blade so that the cutting unit cuts the recording paper.

4. The mobile printer according to claim 3, wherein the cutting unit has a second blade made of metal, and the second blade presses the recording paper against the first blade so that the cutting unit cuts the recording paper.

5. The mobile printer according to claim 3, wherein the first blade has a sawtooth shape.

6. The mobile printer according to claim 1, wherein the power receiving coil includes a coil region where an annular coil through which the power reception signal is transmitted is located and a coil inner region located inside the coil region, and
   at least a part of the adhesive member is located between the coil inner region and the power supply surface.

7. The mobile printer according to claim 6, wherein
the power receiving coil includes a coil outer region located outside the coil region, and
at least a part of the adhesive member is located between the coil outer region and the power supply surface.

8. The mobile printer according to claim 6, wherein
the power receiving coil has a mold member provided so as to cover the annular coil, and
the adhesive member is located between an almost entire region on one surface of the mold member and the power supply surface.

9. The mobile printer according to claim 6, wherein
the power receiving coil is located so as not to overlap with an electronic component in a direction perpendicular to the power supply surface.

10. The mobile printer according to claim 1, wherein
the power supply unit has a battery module, and
a partition wall is located between the battery module and the power receiving module.

11. The mobile printer according to claim 1, further comprising:
a control unit controlling an operation of at least one of the print head, the transport unit, and the cutting unit, wherein
the control unit is located so as not to overlap with the power receiving module in a direction perpendicular to the power supply surface.

* * * * *